United States Patent
Chen et al.

(10) Patent No.: US 8,804,024 B2
(45) Date of Patent: Aug. 12, 2014

(54) MOBILE DEVICE AND OPTICAL IMAGING LENS THEREOF

(71) Applicant: GeniuS Electronic Optical Co., Ltd., Taichung (TW)

(72) Inventors: Shih Han Chen, Taichung (TW); Chung Chih Chang, Taichung (TW); Hung Chien Hsieh, Taichung (TW)

(73) Assignee: Genius Electronic Optical Co., Ltd. (TW)

( * ) Notice: Subject to any disclaimer, the term of this patent is extended or adjusted under 35 U.S.C. 154(b) by 0 days.

(21) Appl. No.: 13/801,161

(22) Filed: Mar. 13, 2013

(65) Prior Publication Data

US 2014/0132829 A1   May 15, 2014

(30) Foreign Application Priority Data

Nov. 15, 2012  (CN) .......................... 2012 1 0459254

(51) Int. Cl.
*G02B 13/18* (2006.01)
*H04N 5/225* (2006.01)
*H04N 5/262* (2006.01)

(52) U.S. Cl.
USPC ....... 348/340; 348/335; 348/240.99; 359/715

(58) Field of Classification Search
USPC .............. 348/240.99, 335, 340; 359/715, 734
See application file for complete search history.

(56) References Cited

U.S. PATENT DOCUMENTS

| | | | |
|---|---|---|---|
| 7,274,515 B2 | 9/2007 | Noda | |
| 7,345,830 B2 | 3/2008 | Shinohara | |
| 7,365,920 B2 | 4/2008 | Noda | |
| 7,375,903 B2 | 5/2008 | Taniyama | |
| 7,777,972 B1 | 8/2010 | Chen et al. | |
| 7,920,340 B2 | 4/2011 | Tang | |
| 7,957,079 B2 | 6/2011 | Tang | |
| 8,179,470 B2 | 5/2012 | Chen et al. | |
| 8,218,253 B2 | 7/2012 | Tang | |
| 8,228,622 B2 | 7/2012 | Tang | |
| 8,253,843 B2 | 8/2012 | Lin | |
| 8,520,124 B2 * | 8/2013 | Ozaki ........................... 348/335 |
| 2008/0266670 A1 | 10/2008 | Liao | |
| 2010/0157453 A1 | 6/2010 | Su et al. | |
| 2011/0096408 A1 * | 4/2011 | Kakimoto ..................... 359/687 |
| 2011/0157453 A1 | 6/2011 | Chen et al. | |
| 2011/0188132 A1 | 8/2011 | Yamakawa | |
| 2011/0188133 A1 | 8/2011 | Yamakawa | |
| 2011/0242683 A1 | 10/2011 | Yamakawa | |
| 2011/0299178 A1 | 12/2011 | Kitahara | |
| 2012/0013998 A1 | 1/2012 | Tang et al. | |
| 2012/0266670 A1 | 10/2012 | Ichisawa | |

FOREIGN PATENT DOCUMENTS

| | | |
|---|---|---|
| JP | 2009-258286 A | 11/2009 |
| JP | 2010-96820 A | 4/2010 |
| JP | 2011-95301 A | 5/2011 |

(Continued)

*Primary Examiner* — Tuan Ho
*Assistant Examiner* — Selam Gebriel
(74) *Attorney, Agent, or Firm* — Baker & McKenzie LLP

(57) ABSTRACT

Present embodiments provide for a mobile device and an optical imaging lens thereof. The optical imaging lens comprises four lens elements positioned sequentially from an object side to an image side. Though controlling the convex or concave shape of the surfaces, the refracting power and/or the ratio or difference among the parameters of the lens element(s), the optical imaging lens shows better optical characteristics and the total length of the optical imaging lens is shortened.

20 Claims, 24 Drawing Sheets

(56) References Cited

FOREIGN PATENT DOCUMENTS

| | | |
|---|---|---|
| JP | 2012-68292 A | 4/2012 |
| TW | M354079 U1 | 4/2009 |
| TW | M356116 U1 | 5/2009 |
| TW | M360369 U1 | 7/2009 |
| TW | 201122541 A1 | 7/2011 |
| TW | 201144889 A1 | 12/2011 |

\* cited by examiner

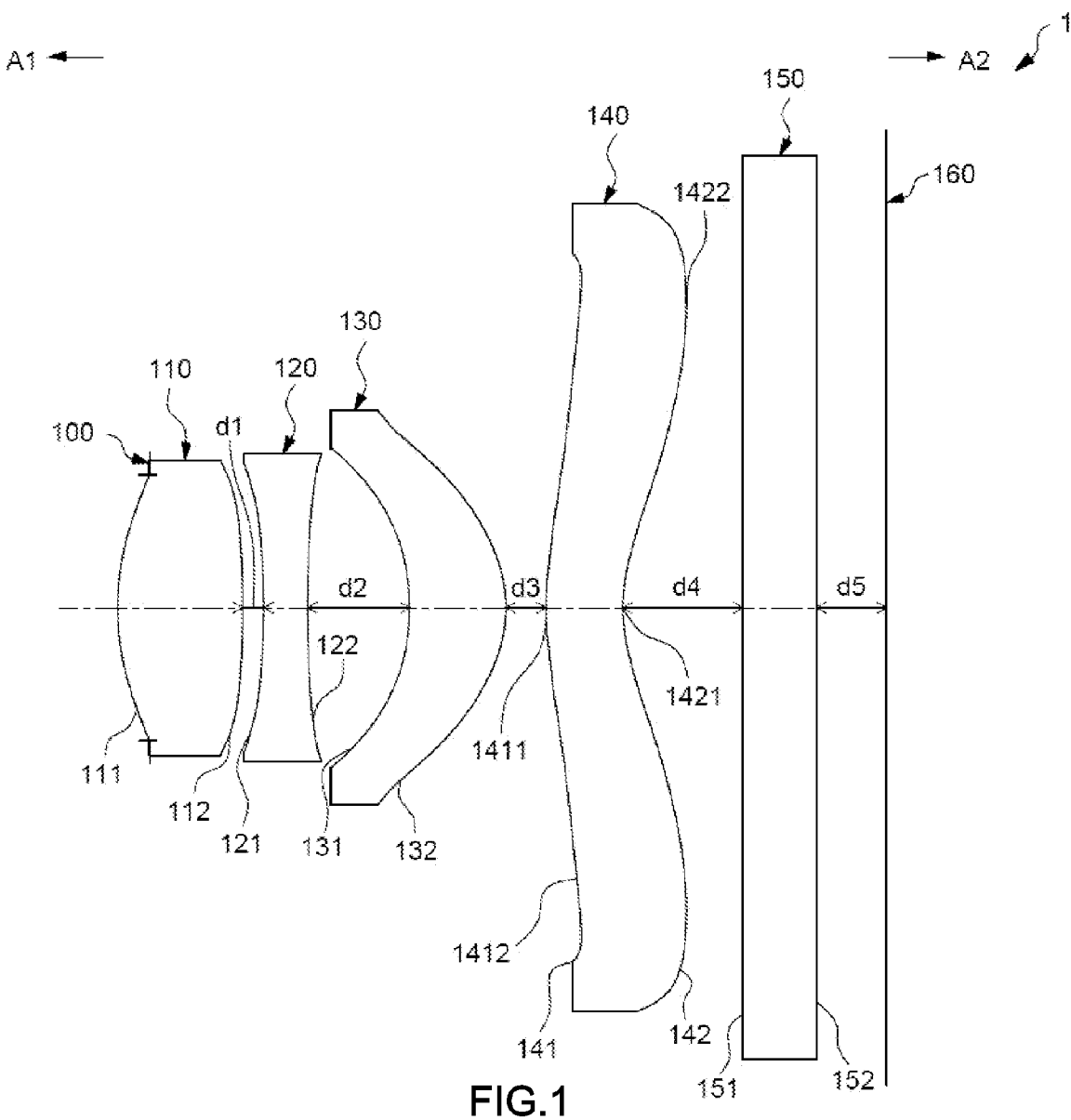
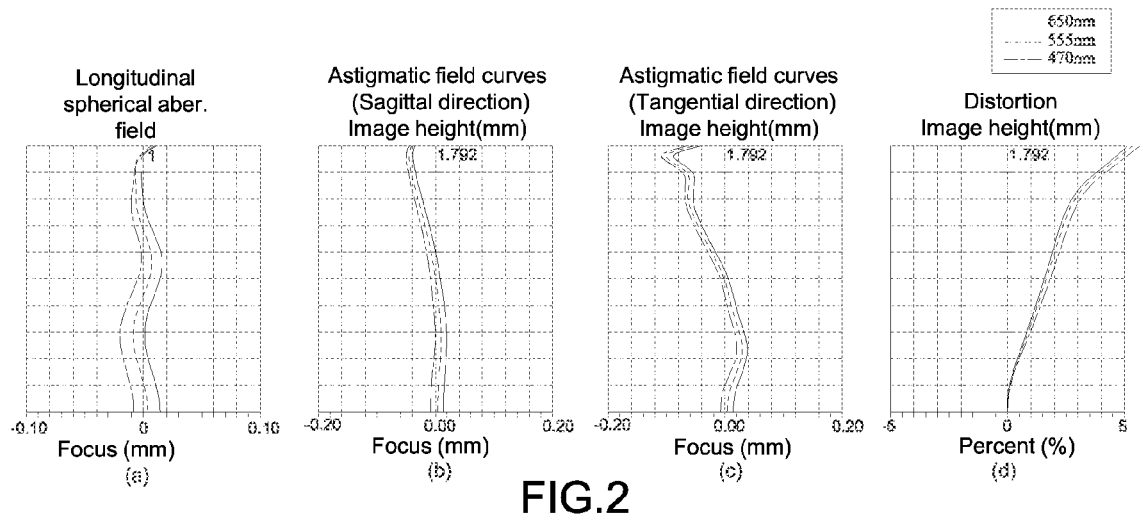

| \multicolumn{8}{c|}{f(Focus)= 2.462 mm, HFOV(Half angular field of view)= 36.371 deg.} |
|---|---|---|---|---|---|---|---|
| \multicolumn{8}{c|}{length of the optical imaging lens= 3.174, Fno= 2.2, Image height= 1.792} |
| Surface # | | Radius | Thickness | Refractive index | Abbe number | Focus | Material |
| - | Object | ∞ | 370.000 | | | | |
| 100 | Aperture stop | ∞ | -0.127 | | | | |
| 111 | 1st lens element | 1.175 | 0.511 | 1.535 | 55.635 | 1.978 | plastic |
| 112 | | -9.229 | 0.089 | | | | |
| 121 | 2nd lens element | -3.502 | 0.184 | 1.632 | 23.279 | -4.338 | plastic |
| 122 | | 13.368 | 0.420 | | | | |
| 131 | 3rd lens element | -0.869 | 0.398 | 1.535 | 55.635 | 1.995 | plastic |
| 132 | | -0.556 | 0.166 | | | | |
| 141 | 4th lens element | 1.847 | 0.315 | 1.531 | 55.744 | -2.412 | plastic |
| 142 | | 0.713 | 0.500 | | | | |
| 151 | IR cut filter | ∞ | 0.300 | | | | |
| 152 | | ∞ | 0.290 | | | | |
| 160 | Image plane | ∞ | | | | | |

FIG.4

| Aspherical parameters | | | | |
|---|---|---|---|---|
| Surface # | 111 | 112 | 121 | 122 |
| K | -6.44E+00 | -6.96E+01 | -1.08E+02 | 2.06E+01 |
| $a_4$ | 5.20E-01 | -2.92E-01 | -1.12E-01 | 4.85E-01 |
| $a_6$ | -1.38E+00 | 2.77E+00 | -1.29E+00 | -2.66E+00 |
| $a_8$ | -1.22E+00 | -4.69E+01 | 1.08E+00 | 1.45E+01 |
| $a_{10}$ | 8.41E+01 | 3.09E+02 | -1.31E+00 | -5.45E+01 |
| $a_{12}$ | -6.51E+02 | -1.13E+03 | 1.14E+00 | 9.44E+01 |
| $a_{14}$ | 2.31E+03 | 2.09E+03 | 2.64E+01 | 6.60E+01 |
| $a_{16}$ | -3.94E+03 | -8.93E+02 | -4.07E+00 | -4.72E+02 |
| $a_{18}$ | 2.37E+03 | -2.57E+03 | 1.19E+02 | 5.17E+02 |
| $a_{20}$ | 4.85E+02 | 2.80E+03 | -3.45E+02 | -4.52E+01 |
| Surface # | 131 | 132 | 141 | 142 |
| K | 5.10E-01 | -1.81E+00 | -6.47E+00 | -5.11E+00 |
| $a_4$ | -3.73E-02 | -1.24E-01 | -1.81E-01 | -2.13E-01 |
| $a_6$ | 2.88E+00 | -4.91E-01 | 5.22E-02 | 2.49E-01 |
| $a_8$ | -3.48E+01 | -3.51E+00 | 9.64E-02 | -3.58E-01 |
| $a_{10}$ | 2.55E+02 | 2.88E+01 | -7.58E-02 | 4.40E-01 |
| $a_{12}$ | -1.25E+03 | -1.00E+02 | 1.31E-03 | -3.72E-01 |
| $a_{14}$ | 4.09E+03 | 1.86E+02 | 1.57E-02 | 2.04E-01 |
| $a_{16}$ | -8.35E+03 | -1.76E+02 | -4.44E-03 | -6.90E-02 |
| $a_{18}$ | 9.78E+03 | 8.44E+01 | 2.26E-06 | 1.31E-02 |
| $a_{20}$ | -5.02E+03 | -2.08E+01 | 7.38E-07 | -1.08E-03 |

FIG.5

| f(Focus)= 2.389 mm, HFOV(Half angular field of view)= 36.688 deg. length of the optical imaging lens= 3.176, Fno= 2.2, Image height= 1.792 |||||||| 
|---|---|---|---|---|---|---|---|
| Surface # | | Radius | Thickness | Refractive index | Abbe number | Focus | Material |
| - | Object | ∞ | 370.000 | | | | |
| 200 | Aperture stop | ∞ | -0.126 | | | | |
| 211 | 1st lens element | 1.179 | 0.515 | 1.535 | 55.635 | 1.796 | plastic |
| 212 | | -8.897 | 0.043 | | | | |
| 221 | 2nd lens element | -3.561 | 0.200 | 1.632 | 23.279 | -4.386 | plastic |
| 222 | | 13.259 | 0.440 | | | | |
| 231 | 3rd lens element | -0.876 | 0.404 | 1.535 | 55.635 | 1.956 | plastic |
| 232 | | -0.554 | 0.164 | | | | |
| 241 | 4th lens element | 1.844 | 0.320 | 1.531 | 55.744 | -2.389 | plastic |
| 242 | | 0.708 | 0.500 | | | | |
| 251 | IR cut filter | ∞ | 0.300 | | | | |
| 252 | | ∞ | 0.290 | | | | |
| 260 | Image plane | ∞ | | | | | |

FIG.8

| Aspherical parameters | | | | |
|---|---|---|---|---|
| Surface # | 211 | 212 | 221 | 222 |
| K | -6.39E+00 | -5.78E+01 | -1.14E+02 | -1.74E+00 |
| $a_4$ | 5.21E-01 | -2.90E-01 | -1.06E-01 | 4.80E-01 |
| $a_6$ | -1.32E+00 | 2.75E+00 | -1.28E+00 | -2.64E+00 |
| $a_8$ | -1.14E+00 | -4.66E+01 | 1.07E+00 | 1.44E+01 |
| $a_{10}$ | 8.44E+01 | 3.07E+02 | -1.16E+00 | -5.45E+01 |
| $a_{12}$ | -6.50E+02 | -1.13E+03 | 1.50E+00 | 9.61E+01 |
| $a_{14}$ | 2.31E+03 | 2.09E+03 | 2.45E+01 | 5.66E+01 |
| $a_{16}$ | -3.94E+03 | -9.45E+02 | -1.45E+01 | -4.52E+02 |
| $a_{18}$ | 2.38E+03 | -2.48E+03 | 1.06E+02 | 4.93E+02 |
| $a_{20}$ | 4.65E+02 | 2.79E+03 | -2.62E+02 | -4.97E+01 |
| Surface # | 231 | 232 | 241 | 242 |
| K | 5.22E-01 | -1.80E+00 | -5.63E+00 | -5.35E+00 |
| $a_4$ | -4.18E-02 | -9.67E-02 | -1.81E-01 | -2.08E-01 |
| $a_6$ | 2.90E+00 | -5.52E-01 | 4.89E-02 | 2.45E-01 |
| $a_8$ | -3.47E+01 | -3.44E+00 | 9.90E-02 | -3.60E-01 |
| $a_{10}$ | 2.54E+02 | 2.89E+01 | -7.55E-02 | 4.44E-01 |
| $a_{12}$ | -1.25E+03 | -1.00E+02 | 2.27E-04 | -3.74E-01 |
| $a_{14}$ | 4.09E+03 | 1.85E+02 | 1.70E-02 | 2.04E-01 |
| $a_{16}$ | -8.36E+03 | -1.77E+02 | -6.01E-03 | -6.91E-02 |
| $a_{18}$ | 9.77E+03 | 8.45E+01 | 6.59E-04 | 1.32E-02 |
| $a_{20}$ | -5.00E+03 | -1.98E+01 | 6.97E-05 | -1.08E-03 |

FIG.9

| f(Focus)= 2.524 mm, HFOV(Half angular field of view)= 34.602 deg. length of the optical imaging lens= 3.172, Fno= 2.2, Image height= 1.792 | | | | | | | |
|---|---|---|---|---|---|---|---|
| Surface # | | Radius | Thickness | Refractive index | Abbe number | Focus | Material |
| - | Object | ∞ | 370.000 | | | | |
| 300 | Aperture stop | ∞ | -0.112 | | | | |
| 311 | 1st lens element | 1.225 | 0.486 | 1.544 | 56.114 | 1.812 | plastic |
| 312 | | -4.418 | 0.072 | | | | |
| 321 | 2nd lens element | -3.487 | 0.210 | 1.640 | 23.529 | -3.814 | plastic |
| 322 | | 8.537 | 0.435 | | | | |
| 331 | 3rd lens element | -0.997 | 0.382 | 1.544 | 56.114 | 1.856 | plastic |
| 332 | | -0.571 | 0.260 | | | | |
| 341 | 4th lens element | 7.239 | 0.283 | 1.544 | 56.114 | -1.707 | plastic |
| 342 | | 0.814 | 0.500 | | | | |
| 351 | IR cut filter | ∞ | 0.300 | | | | |
| 352 | | ∞ | 0.244 | | | | |
| 360 | Image plane | ∞ | | | | | |

FIG.12

| Aspherical parameters | | | | |
|---|---|---|---|---|
| Surface # | 311 | 312 | 321 | 322 |
| K | -9.68E+00 | -1.31E+02 | -1.73E+02 | 1.55E+02 |
| $a_4$ | 5.08E-01 | -1.70E-01 | -2.04E-01 | 1.86E-01 |
| $a_6$ | -8.85E-01 | -1.10E+00 | -1.02E+00 | -1.06E+00 |
| $a_8$ | 6.21E-01 | 1.01E-01 | 1.06E+00 | 4.49E-01 |
| $a_{10}$ | -1.15E-01 | 1.10E+00 | -3.29E+00 | 1.47E+00 |
| $a_{12}$ | -2.65E+00 | -3.34E-01 | 8.60E+00 | -4.72E+00 |
| $a_{14}$ | -2.23E+00 | 4.65E-01 | 1.91E+01 | 2.28E+00 |
| $a_{16}$ | -5.50E+00 | 1.98E-01 | -3.01E+01 | 1.89E+00 |
| $a_{18}$ | -4.36E+00 | -3.92E-01 | 1.31E+00 | -6.43E-01 |
| $a_{20}$ | -1.55E+01 | -1.24E+00 | 2.23E+00 | -2.00E+00 |
| Surface # | 331 | 332 | 341 | 342 |
| K | 1.09E-02 | -2.23E+00 | -2.12E+01 | -6.76E+00 |
| $a_4$ | -5.30E-02 | -2.66E-01 | -2.20E-01 | -2.63E-01 |
| $a_6$ | -2.37E-01 | -7.57E-02 | 8.40E-02 | 1.99E-01 |
| $a_8$ | -8.05E-01 | 1.06E-01 | 8.73E-02 | -1.23E-01 |
| $a_{10}$ | 1.17E+00 | -1.10E-02 | -7.69E-02 | 3.85E-02 |
| $a_{12}$ | 2.94E+00 | 8.99E-01 | -1.02E-03 | 2.91E-03 |
| $a_{14}$ | -6.98E+00 | 3.80E+00 | 1.95E-02 | -5.63E-03 |
| $a_{16}$ | -7.69E+00 | -5.66E+00 | -5.82E-03 | 1.20E-03 |
| $a_{18}$ | -9.36E+00 | 2.10E-01 | 1.81E-04 | 4.01E-06 |
| $a_{20}$ | -2.70E+01 | 4.96E-01 | 1.69E-04 | 2.62E-06 |

FIG.13

| f(Focus)= 2.331 mm, HFOV(Half angular field of view)= 36.881 deg. length of the optical imaging lens= 3.078, Fno= 2.2, Image height= 1.792 |||||||||
|---|---|---|---|---|---|---|---|
| Surface # | | Radius | Thickness | Refractive index | Abbe number | Focus | Material |
| - | Object | ∞ | 370.000 | | | | |
| 400 | Aperture stop | ∞ | -0.087 | | | | |
| 411 | 1st lens element | 1.202 | 0.435 | 1.544 | 56.114 | 1.857 | plastic |
| 412 | | -5.647 | 0.065 | | | | |
| 421 | 2nd lens element | -3.326 | 0.216 | 1.640 | 23.529 | -3.660 | plastic |
| 422 | | 8.370 | 0.406 | | | | |
| 431 | 3rd lens element | -0.964 | 0.343 | 1.544 | 56.114 | 1.987 | plastic |
| 432 | | -0.575 | 0.076 | | | | |
| 441 | 4th lens element | 1.739 | 0.379 | 1.531 | 55.744 | -2.370 | plastic |
| 442 | | 0.676 | 0.544 | | | | |
| 451 | IR cut filter | ∞ | 0.300 | | | | |
| 452 | | ∞ | 0.315 | | | | |
| 460 | Image plane | ∞ | | | | | |

FIG.16

| Aspherical parameters | | | | |
|---|---|---|---|---|
| Surface # | 411 | 412 | 421 | 422 |
| K | -8.35E+00 | -1.47E+02 | -1.24E+02 | 1.55E+02 |
| $a_4$ | 5.33E-01 | -1.63E-01 | -2.18E-01 | 2.53E-01 |
| $a_6$ | -9.12E-01 | -1.14E+00 | -9.31E-01 | -1.04E+00 |
| $a_8$ | 5.52E-01 | 6.69E-02 | 1.09E+00 | 6.28E-01 |
| $a_{10}$ | -2.76E-01 | 1.19E+00 | -3.29E+00 | 1.77E+00 |
| $a_{12}$ | -3.00E+00 | -4.46E-01 | 9.08E+00 | -4.53E+00 |
| $a_{14}$ | -2.47E+00 | -7.90E-01 | 2.03E+01 | 1.64E+00 |
| $a_{16}$ | -6.00E+00 | -2.76E+00 | -2.84E+01 | -5.34E-01 |
| $a_{18}$ | -1.05E+01 | -2.83E+00 | 1.28E+00 | -3.12E+00 |
| $a_{20}$ | -6.57E+01 | 8.79E+00 | -5.23E+00 | 9.27E+00 |
| Surface # | 431 | 432 | 441 | 442 |
| K | -3.02E-01 | -2.23E+00 | -2.05E+01 | -6.07E+00 |
| $a_4$ | 3.58E-02 | -2.84E-01 | -2.17E-01 | -2.58E-01 |
| $a_6$ | -9.66E-03 | -7.72E-02 | 8.09E-02 | 1.98E-01 |
| $a_8$ | -9.67E-01 | 2.04E-01 | 8.67E-02 | -1.27E-01 |
| $a_{10}$ | 8.74E-01 | 8.39E-02 | -7.84E-02 | 3.79E-02 |
| $a_{12}$ | 3.08E+00 | 9.36E-01 | -1.80E-03 | 3.00E-03 |
| $a_{14}$ | -5.34E+00 | 3.92E+00 | 1.91E-02 | -5.54E-03 |
| $a_{16}$ | -3.43E+00 | -5.92E+00 | -6.07E-03 | 1.24E-03 |
| $a_{18}$ | -4.27E+00 | 6.22E-02 | 7.68E-07 | 2.84E-08 |
| $a_{20}$ | -3.87E+01 | 3.04E-01 | 2.31E-06 | 7.82E-06 |

FIG.17

| f(Focus)= 2.324 mm, HFOV(Half angular field of view)= 36.852 deg. length of the optical imaging lens= 3.067, Fno= 2.2, Image height= 1.792 | | | | | | | |
|---|---|---|---|---|---|---|---|
| Surface # | | Radius | Thickness | Refractive index | Abbe number | Focus | Material |
| - | Object | ∞ | 370.000 | | | | |
| 500 | Aperture stop | ∞ | -0.089 | | | | |
| 511 | 1st lens element | 1.198 | 0.446 | 1.544 | 56.114 | 1.843 | plastic |
| 512 | | -5.446 | 0.065 | | | | |
| 521 | 2nd lens element | -3.294 | 0.265 | 1.640 | 23.529 | -3.635 | plastic |
| 522 | | 8.372 | 0.404 | | | | |
| 531 | 3rd lens element | -0.969 | 0.312 | 1.544 | 56.114 | 2.025 | plastic |
| 532 | | -0.575 | 0.075 | | | | |
| 541 | 4th lens element | 1.805 | 0.384 | 1.531 | 55.744 | -2.353 | plastic |
| 542 | | 0.685 | 0.522 | | | | |
| 551 | IR cut filter | ∞ | 0.300 | | | | |
| 552 | | ∞ | 0.293 | | | | |
| 560 | Image plane | ∞ | | | | | |

FIG.20

| Aspherical parameters | | | | |
|---|---|---|---|---|
| Surface # | 511 | 512 | 521 | 522 |
| K | -8.33E+00 | -1.41E+02 | -1.23E+02 | 1.55E+02 |
| $a_4$ | 5.32E-01 | -1.64E-01 | -2.19E-01 | 2.54E-01 |
| $a_6$ | -9.11E-01 | -1.14E+00 | -9.30E-01 | -1.04E+00 |
| $a_8$ | 5.57E-01 | 6.76E-02 | 1.08E+00 | 6.32E-01 |
| $a_{10}$ | -2.59E-01 | 1.19E+00 | -3.30E+00 | 1.78E+00 |
| $a_{12}$ | -2.94E+00 | -4.29E-01 | 9.06E+00 | -4.51E+00 |
| $a_{14}$ | -2.26E+00 | -7.39E-01 | 2.03E+01 | 1.68E+00 |
| $a_{16}$ | -5.24E+00 | -2.62E+00 | -2.85E+01 | -4.66E-01 |
| $a_{18}$ | -7.58E+00 | -2.47E+00 | 1.05E+00 | -3.01E+00 |
| $a_{20}$ | -5.46E+01 | 9.68E+00 | -5.68E+00 | 9.42E+00 |
| Surface # | 531 | 532 | 541 | 542 |
| K | -2.86E-01 | -2.24E+00 | -2.11E+01 | -5.95E+00 |
| $a_4$ | 3.14E-02 | -2.84E-01 | -2.14E-01 | -2.55E-01 |
| $a_6$ | -1.56E-02 | -7.72E-02 | 8.15E-02 | 1.98E-01 |
| $a_8$ | -9.85E-01 | 2.04E-01 | 8.68E-02 | -1.27E-01 |
| $a_{10}$ | 8.33E-01 | 8.36E-02 | -7.84E-02 | 3.78E-02 |
| $a_{12}$ | 2.99E+00 | 9.34E-01 | -1.83E-03 | 2.99E-03 |
| $a_{14}$ | -5.49E+00 | 3.91E+00 | 1.91E-02 | -5.54E-03 |
| $a_{16}$ | -3.71E+00 | -5.93E+00 | -6.06E-03 | 1.24E-03 |
| $a_{18}$ | -4.78E+00 | 4.90E-02 | 2.47E-06 | 1.20E-06 |
| $a_{20}$ | -3.96E+01 | 2.80E-01 | 2.31E-06 | 8.61E-06 |

FIG.21

| f(Focus)= 2.322 mm, HFOV(Half angular field of view)= 36.905 deg. length of the optical imaging lens= 3.084, Fno= 2.2, Image height= 1.792 | | | | | | | |
|---|---|---|---|---|---|---|---|
| Surface # | | Radius | Thickness | Refractive index | Abbe number | Focus | Material |
| - | Object | ∞ | 370.000 | | | | |
| 600 | Aperture stop | ∞ | 0.086 | | | | |
| 611 | 1st lens element | 1.199 | 0.431 | 1.544 | 56.114 | 1.853 | plastic |
| 612 | | -5.653 | 0.065 | | | | |
| 621 | 2nd lens element | -3.327 | 0.213 | 1.640 | 23.529 | -3.667 | plastic |
| 622 | | 8.372 | 0.406 | | | | |
| 631 | 3rd lens element | -0.963 | 0.350 | 1.544 | 56.114 | 1.982 | plastic |
| 632 | | -0.575 | 0.075 | | | | |
| 641 | 4th lens element | 1.712 | 0.378 | 1.531 | 55.744 | -2.378 | plastic |
| 642 | | 0.672 | 0.636 | | | | |
| 651 | IR cut filter | ∞ | 0.300 | | | | |
| 652 | | ∞ | 0.232 | | | | |
| 660 | Image plane | ∞ | | | | | |

FIG.24

| Aspherical parameters | | | | |
|---|---|---|---|---|
| Surface # | 611 | 612 | 621 | 622 |
| K | -8.35E+00 | -1.57E+02 | -1.24E+02 | 1.55E+02 |
| $a_4$ | 5.33E-01 | -1.62E-01 | -2.18E-01 | 2.53E-01 |
| $a_6$ | -9.13E-01 | -1.14E+00 | -9.31E-01 | -1.05E+00 |
| $a_8$ | 5.49E-01 | 6.55E-02 | 1.09E+00 | 6.26E-01 |
| $a_{10}$ | -2.85E-01 | 1.18E+00 | -3.29E+00 | 1.76E+00 |
| $a_{12}$ | -3.02E+00 | -4.53E-01 | 9.08E+00 | -4.54E+00 |
| $a_{14}$ | -2.54E+00 | -8.05E-01 | 2.04E+01 | 1.62E+00 |
| $a_{16}$ | -6.18E+00 | -2.79E+00 | -2.84E+01 | -5.81E-01 |
| $a_{18}$ | -1.09E+01 | -2.90E+00 | 1.21E+00 | -3.22E+00 |
| $a_{20}$ | -6.65E+01 | 8.59E+00 | -5.22E+00 | 9.03E+00 |
| Surface # | 631 | 632 | 641 | 642 |
| K | -3.12E-01 | -2.24E+00 | -1.99E+01 | -5.94E+00 |
| $a_4$ | 3.69E-02 | -2.84E-01 | -2.15E-01 | -2.60E-01 |
| $a_6$ | -5.95E-03 | -7.75E-02 | 8.07E-02 | 1.99E-01 |
| $a_8$ | -9.56E-01 | 2.03E-01 | 8.66E-02 | -1.26E-01 |
| $a_{10}$ | 8.97E-01 | 8.33E-02 | -7.84E-02 | 3.79E-02 |
| $a_{12}$ | 3.12E+00 | 9.36E-01 | -1.81E-03 | 3.00E-03 |
| $a_{14}$ | -5.27E+00 | 3.92E+00 | 1.91E-02 | -5.54E-03 |
| $a_{16}$ | -3.31E+00 | -5.92E+00 | -6.06E-03 | 1.24E-03 |
| $a_{18}$ | -4.09E+00 | 6.73E-02 | 5.17E-06 | 1.48E-06 |
| $a_{20}$ | -3.85E+01 | 3.14E-01 | 9.08E-06 | 8.59E-06 |

FIG.25

| f(Focus)= 2.213 mm, HFOV(Half angular field of view)= 37.658 deg. length of the optical imaging lens= 3.033, Fno= 2.2, Image height= 1.792 ||||||||
|---|---|---|---|---|---|---|---|
| Surface # | | Radius | Thickness | Refractive index | Abbe number | Focus | Material |
| - | Object | ∞ | 370.000 | | | | |
| 700 | Aperture stop | ∞ | -0.064 | | | | |
| 711 | 1st lens element | 1.180 | 0.371 | 1.544 | 56.114 | 1.831 | plastic |
| 712 | | -5.811 | 0.058 | | | | |
| 721 | 2nd lens element | -3.306 | 0.280 | 1.640 | 23.529 | -3.646 | plastic |
| 722 | | 8.396 | 0.425 | | | | |
| 731 | 3rd lens element | -0.979 | 0.300 | 1.544 | 56.114 | 2.012 | plastic |
| 732 | | -0.573 | 0.075 | | | | |
| 741 | 4th lens element | 1.673 | 0.386 | 1.531 | 55.744 | -2.494 | plastic |
| 742 | | 0.681 | 0.457 | | | | |
| 751 | IR cut filter | ∞ | 0.300 | | | | |
| 752 | | ∞ | 0.380 | | | | |
| 760 | Image plane | ∞ | | | | | |

FIG.28

| Aspherical parameters | | | | |
|---|---|---|---|---|
| Surface # | 711 | 712 | 721 | 722 |
| K | -8.36E+00 | -2.26E+02 | -1.17E+02 | 1.54E+02 |
| $a_4$ | 5.29E-01 | -1.46E-01 | -2.17E-01 | 2.52E-01 |
| $a_6$ | -9.25E-01 | -1.14E+00 | -9.20E-01 | -1.05E+00 |
| $a_8$ | 5.13E-01 | 4.45E-02 | 1.11E+00 | 6.18E-01 |
| $a_{10}$ | -3.90E-01 | 1.12E+00 | -3.24E+00 | 1.74E+00 |
| $a_{12}$ | -3.31E+00 | -6.47E-01 | 9.18E+00 | -4.59E+00 |
| $a_{14}$ | -3.31E+00 | -1.34E+00 | 2.06E+01 | 1.49E+00 |
| $a_{16}$ | -7.47E+00 | -3.83E+00 | -2.78E+01 | -8.75E-01 |
| $a_{18}$ | -1.33E+01 | -5.55E+00 | 3.07E+00 | -3.89E+00 |
| $a_{20}$ | -6.74E+01 | 1.30E+00 | -2.26E-01 | 7.66E+00 |
| Surface # | 731 | 732 | 741 | 742 |
| K | -3.68E-01 | -2.21E+00 | -1.61E+01 | -5.82E+00 |
| $a_4$ | 5.43E-02 | -2.83E-01 | -2.01E-01 | -2.58E-01 |
| $a_6$ | -1.55E-02 | -7.46E-02 | 7.59E-02 | 1.99E-01 |
| $a_8$ | -9.77E-01 | 2.05E-01 | 8.54E-02 | -1.21E-01 |
| $a_{10}$ | 8.83E-01 | 8.16E-02 | -7.89E-02 | 3.58E-02 |
| $a_{12}$ | 3.13E+00 | 9.30E-01 | -2.05E-03 | 2.91E-03 |
| $a_{14}$ | -5.20E+00 | 3.91E+00 | 1.90E-02 | -5.56E-03 |
| $a_{16}$ | -3.09E+00 | -5.94E+00 | -6.13E-03 | 1.23E-03 |
| $a_{18}$ | -3.50E+00 | 4.26E-02 | 1.13E-04 | 3.76E-06 |
| $a_{20}$ | -3.72E+01 | 2.82E-01 | 9.60E-06 | 9.01E-06 |

FIG.29

| Embodiment | 1st Embodiment | 2nd Embodiment | 3rd Embodiment | 4th Embodiment |
|---|---|---|---|---|
| AAG | 0.676 | 0.648 | 0.768 | 0.547 |
| ALT | 1.408 | 1.438 | 1.360 | 1.373 |
| ALT/ $AGL_{12}$ | 15.749 | 33.416 | 18.791 | 21.113 |
| $AGL_{34}$ - $AGL_{12}$ | 0.077 | 0.121 | 0.187 | 0.011 |
| $AGL_{23}$ - $CT_3$ | 0.023 | 0.036 | 0.054 | 0.063 |
| $CT_1$-$CT_3$ | 0.113 | 0.110 | 0.104 | 0.092 |
| $CT_3$/$CT_2$ | 2.157 | 2.024 | 1.818 | 1.589 |
| $CT_3$/ALT | 0.282 | 0.281 | 0.281 | 0.250 |
| ALT/$AGL_{34}$ | 8.471 | 8.751 | 5.236 | 18.064 |
| ALT/$CT_2$ | 7.636 | 7.203 | 6.478 | 6.358 |

| Embodiment | 5th Embodiment | 6th Embodiment | 7th Embodiment |
|---|---|---|---|
| AAG | 0.545 | 0.546 | 0.558 |
| ALT | 1.407 | 1.371 | 1.338 |
| ALT/ $AGL_{12}$ | 21.627 | 21.068 | 23.064 |
| $AGL_{34}$ - $AGL_{12}$ | 0.010 | 0.010 | 0.017 |
| $AGL_{23}$ - $CT_3$ | 0.092 | 0.056 | 0.125 |
| $CT_1$-$CT_3$ | 0.134 | 0.081 | 0.071 |
| $CT_3$/$CT_2$ | 1.179 | 1.643 | 1.072 |
| $CT_3$/ALT | 0.222 | 0.255 | 0.224 |
| ALT/$AGL_{34}$ | 18.723 | 18.251 | 17.866 |
| ALT/$CT_2$ | 5.317 | 6.438 | 4.778 |

FIG.30

MOBILE DEVICE AND OPTICAL IMAGING LENS THEREOF

INCORPORATION BY REFERENCE

This application claims priority from Chinese Patent Application No. 201210459254.0, filed on Nov. 15, 2012, the contents of which are hereby incorporated by reference in their entirety for all purposes.

TECHNICAL FIELD

The present invention relates to a mobile device and an optical imaging lens thereof, and particularly, relates to a mobile device applying an optical imaging lens having four lens elements and an optical imaging lens thereof.

BACKGROUND

Dimension reduction is the major consideration for designing an optical imaging lens in recent years. When reducing the length of the optical imaging lens, however, achieving good optical characteristics becomes a challenging problem.

U.S. Patent Publication No. 2011/0299178 disclosed an optical imaging lens constructed with an optical imaging lens having four lens elements. The refracting power of the first lens element is negative, but that of the second lens element is positive. The third lens element is concave on the whole image-side surface thereof and the fourth lens element is convex on the whole image-side surface thereof. With these designed shapes and refracting powers, the lengths of some imaging lens reach 18~19 mm. Such configuration fails to achieve preferable small size of the whole system as well as good optical characteristics.

U.S. Patent Publication No. 2011/0242683, 2011/0188132, and 2011/0188133 all disclosed an optical imaging lens constructed with an optical imaging lens having four lens elements. The refracting powers of the first two lens elements are negative. However, the great air gap existing between the first two lens elements is unfavorable for shortening the length of the optical imaging lens.

U.S. Pat. Nos. 7,345,830, 7,375,903, 8,253,843 and U.S. Patent Publication No. 2010/0157453 all disclosed an optical imaging lens constructed with an optical imaging lens having four lens elements. Although the refracting powers of the first and second lens elements are preferable positive and negative in order, the air gap between the first and the second lens elements is great for the concave image-side surface of the first lens element and the concave object-side surface of the second lens element. Therefore, the length of the optical imaging lens is not shortened.

Additionally, U.S. Pat. Nos. 7,365,920, 7,274,515, 7,920,340, 7,777,972, 8,179,470, 7,957,079, 8,218,253, 8,228,622 and U.S. Patent Publication No. 2012/0013998 and 2012/0266670 all disclosed an optical imaging lens constructed with an optical imaging lens having four lens elements. However, the configurations of the lens elements thereof are unfavorable for improving the optical aberrations and meanwhile shortening the length of the optical imaging lens.

Therefore, there is needed to develop optical imaging lens with a shorter length, while also having good optical characters.

SUMMARY

An object of the present invention is to provide a mobile device and an optical imaging lens thereof. With controlling the convex or concave shape, the refracting power and/or the ratio or difference among the parameters of the lens element(s), the length of the optical imaging lens is shortened and meanwhile the good optical characters, and system functionality are sustained.

In an exemplary embodiment, an optical imaging lens, sequentially from an object side to an image side, comprises an aperture stop, first, second, third and fourth lens elements, each of said first, second, third and fourth lens elements having an object-side surface facing toward the object side and an image-side surface facing toward the image side, wherein: the first lens element has positive refracting power, and the image-side surface thereof is a convex surface; the second lens element has negative refracting power, and the image-side surface thereof is a concave surface; the third lens element has positive refracting power, the object-side surface thereof is a concave surface, and the image-side surface thereof is a convex surface; the object-side surface of the fourth lens element comprises a convex portion in a vicinity of the optical axis and a concave portion in a vicinity of a periphery of the fourth lens element; the optical imaging lens as a whole has only the four lens elements having refracting power; and the sum of the thickness of all four lens elements along the optical axis is ALT, an air gap between the first lens element and the second lens element along the optical axis is $AGL_{12}$, and ALT and $AGL_{12}$ satisfy the equation:

$$ALT/AGL_{12} \leq 36. \qquad \text{Equation (1)}$$

In another exemplary embodiment, other equation(s) can be taken into consideration. For example, $AGL_{12}$ and an air gap between the third lens element and the fourth lens element along the optical axis, $AGL_{34}$, could be controlled to satisfy the equation as follows:

$$AGL_{34} - AGL_{12} \leq 0 \text{ (mm)} \qquad \text{Equation (2); or}$$

An air gap between the second lens element and the third lens element along the optical axis, $AGL_{23}$, and a central thickness of the third lens element along the optical axis, $CT_3$, could be controlled to satisfy the equation as follows:

$$AGL_{23} - CT_3 \leq 0 \text{ (mm)} \qquad \text{Equation (3); or}$$

A central thickness of the first lens element along the optical axis, $CT_1$, and $CT_3$ could be controlled to satisfy the equation as follows:

$$CT_1 - CT_3 \leq 0 \text{ (mm)} \qquad \text{Equation (4); or}$$

A central thickness of the second lens element along the optical axis, $CT_2$, and $CT_3$ could be controlled to satisfy the equation(s) as follows:

$$CT_3/CT_2 \geq 1.7 \qquad \text{Equation (5); or}$$

ALT and $CT_3$ could be controlled to satisfy the equation as follows:

$$CT_3/ALT \leq 0.7 \qquad \text{Equation (6); or}$$

ALT and $AGL_{34}$ could be controlled to satisfy the equation(s) as follows:

$$ALT/AGL_{34} \leq 20 \qquad \text{Equation (7); or}$$

$$ALT/AGL_{34} \leq 12 \qquad \text{Equation (7'); or}$$

ALT and $CT_2$ could be controlled to satisfy the equation as follows:

$$ALT/CT_2 \leq 6.5 \qquad \text{Equation (8).}$$

Aforesaid exemplary embodiments are not limited and could be selectively incorporated in other embodiments described herein.

In another exemplary embodiment, a mobile device comprising a housing and a photography module positioned in the housing is provided. The photography module comprises any of aforesaid example embodiments of optical imaging lens, a lens barrel, a module housing unit, a substrate, and an image sensor. The lens barrel is for positioning the optical imaging lens, the module housing unit is for positioning the lens barrel, the substrate is for positioning the module housing unit, and the image sensor is positioned at the image-side of the optical imaging lens.

In some exemplary embodiments, the module housing unit optionally comprises a seat element for positioning the lens barrel and moving along with the optical axis of the optical imaging lens.

Through controlling the convex or concave shape of the surfaces, the refracting power and/or the ratio or difference among the parameters of the lens element(s), the mobile device and the optical imaging lens thereof in exemplary embodiments achieve good optical characters and effectively shorten the length of the optical imaging lens.

BRIEF DESCRIPTION OF THE DRAWINGS

Exemplary embodiments will be more readily understood from the following detailed description when read in conjunction with the appended drawing, in which:

FIG. 1 is a cross-sectional view of a first embodiment of an optical imaging lens having four lens elements according to the present disclosures;

FIG. 2 is a chart of longitudinal spherical aberration and other kinds of optical aberrations of a first embodiment of the optical imaging lens according to the present disclosures;

FIG. 4 is a table of optical data for each lens element of a first embodiment of an optical imaging lens according to the present disclosures;

FIG. 5 is a table of aspherical data of a first embodiment of the optical imaging lens according to the present disclosures;

FIG. 8 is a table of optical data for each lens element of the optical imaging lens of a second embodiment of the present disclosures;

FIG. 9 is a table of aspherical data of a second embodiment of the optical imaging lens according to the present disclosures;

FIG. 12 is a table of optical data for each lens element of the optical imaging lens of a third embodiment of the present disclosures;

FIG. 13 is a table of aspherical data of a third embodiment of the optical imaging lens according to the present disclosures;

FIG. 16 is a table of optical data for each lens element of the optical imaging lens of a fourth embodiment of the present disclosures;

FIG. 17 is a table of aspherical data of a fourth embodiment of the optical imaging lens according to the present disclosures;

FIG. 20 is a table of optical data for each lens element of the optical imaging lens of a fifth embodiment of the present disclosures;

FIG. 21 is a table of aspherical data of a fifth embodiment of the optical imaging lens according to the present disclosures;

FIG. 24 is a table of optical data for each lens element of the optical imaging lens of a sixth embodiment of the present disclosures;

FIG. 25 is a table of aspherical data of a sixth embodiment of the optical imaging lens according to the present disclosures;

FIG. 28 is a table of optical data for each lens element of the optical imaging lens of a seventh embodiment of the present disclosures;

FIG. 29 is a table of aspherical data of a seventh embodiment of the optical imaging lens according to the present disclosures;

FIG. 30 is a table for the values of AAG, ALT, ALT/AGL$_{12}$, AGL$_{34}$–AGL$_{12}$, AGL$_{23}$–CT$_3$, CT$_1$–CT$_3$, CT$_3$/CT$_2$, CT$_3$/ALT, ALT/AGL$_{34}$ and ALT/CT$_2$ of all seven example embodiments;

DETAILED DESCRIPTION

Figure 3:
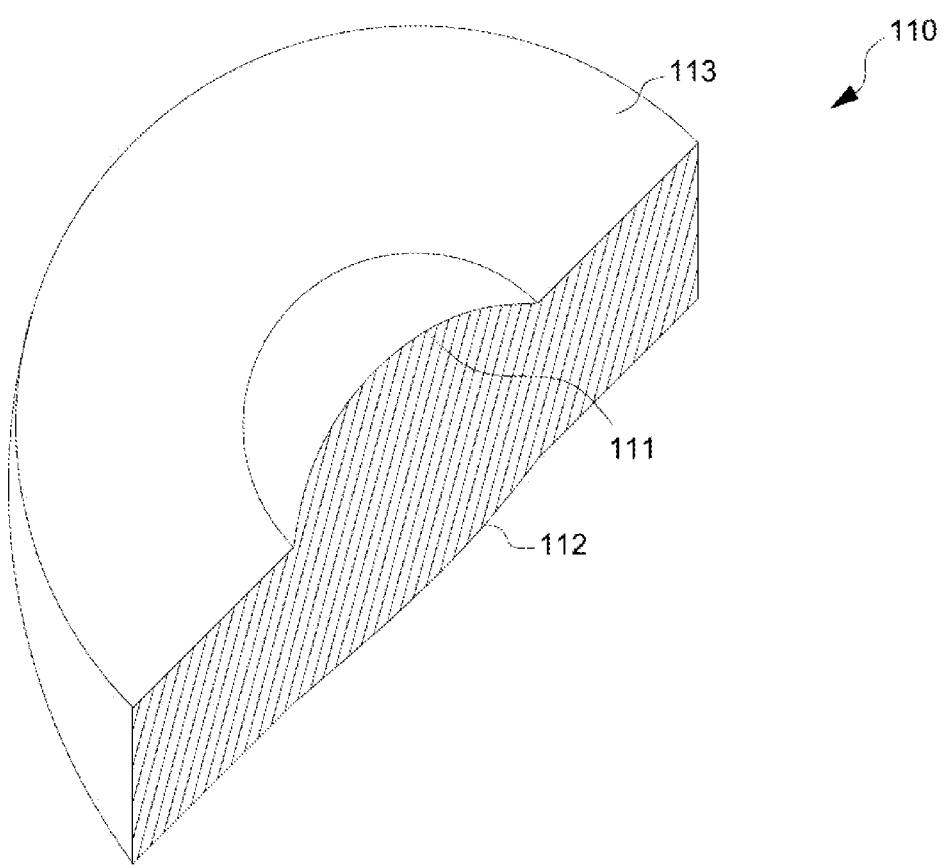
FIG. 3 is a cross-sectional view of a lens element of the optical imaging lens of an example embodiment of the present disclosures.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Example embodiments of an optical imaging lens may comprise an aperture stop, a first lens element, a second lens element, a third lens element and a fourth lens element, each of the lens elements has an object-side surface facing toward the object side and an image-side surface facing toward the image side. These lens elements may be arranged sequentially from an object side to an image side, and example embodiments of the lens as a whole may comprise the four lens elements having refracting power. In an example embodiment: the first lens element has positive refracting power, and the image-side surface thereof is a convex surface; the second lens element has negative refracting power, and the image-side surface thereof is a concave surface; the third lens element has positive refracting power, the object-side surface thereof is a concave surface, and the image-side surface thereof is a convex surface; the object-side surface of the fourth lens element comprises a convex portion in a vicinity of the optical axis and a concave portion in a vicinity of a periphery of the fourth lens element; lens as a whole has only the four lens elements having refracting power; and the sum of the thickness of all four lens elements along the optical axis is ALT, an air gap between the first lens element and the second lens element along the optical axis is $AGL_{12}$, and ALT and $AGL_{12}$ satisfy the equation:

$$ALT/AGL_{12} \leq 36. \quad \text{Equation (1).}$$

Preferably, the lens elements are designed in light of the optical characteristics and the length of the optical imaging lens. For example, the first and third lens elements having positive refracting power provide the light converging ability required in the optical imaging lens. Compared with those systems having one single lens element for providing required light converge ability, the present invention could effectively reduce the difficulty in designing and raise the tolerance of production error for optical imaging lenses. The second lens element having negative refracting power could eliminate the aberration of the optical lens. Additionally, if the image-side surface of the first lens element is designed to be convex, the image-side surface of the second lens element is designed to be concave, the object-side surface of the third lens element is designed to be concave, the image-side surface of the third lens element is designed to be convex, and the fourth lens element is designed to have convex portion in a vicinity of the optical axis and a concave portion in a vicinity of a periphery of the fourth lens element on the object-side surface thereof, it could assist in raising the image quality as well.

In another exemplary embodiment, other ratio or difference among some related parameters could be optionally incorporated. For example, $AGL_{12}$ and an air gap between the third lens element and the fourth lens element along the optical axis, $AGL_{34}$, could be controlled to satisfy the equation as follows:

$$AGL_{34} - AGL_{12} \geq 0 \text{ (mm)} \quad \text{Equation (2); or}$$

An air gap between the second lens element and the third lens element along the optical axis, $AGL_{23}$, and a central thickness of the third lens element along the optical axis, $CT_3$, could be controlled to satisfy the equation as follows:

$$AGL_{23} - CT_3 \geq 0 \text{ (mm)} \quad \text{Equation (3); or}$$

A central thickness of the first lens element along the optical axis, $CT_1$, and $CT_3$ could be controlled to satisfy the equation as follows:

$$CT_1 - CT_3 \geq 0 \text{ (mm)} \quad \text{Equation (4); or}$$

A central thickness of the second lens element along the optical axis, $CT_2$, and $CT_3$ could be controlled to satisfy the equation(s) as follows:

$$CT_3/CT_2 \leq 1.7 \quad \text{Equation (5); or}$$

ALT and $CT_3$ could be controlled to satisfy the equation as follows:

$$CT_3/ALT \leq 0.7 \quad \text{Equation (6); or}$$

ALT and $AGL_{34}$ could be controlled to satisfy the equation(s) as follows:

$$ALT/AGL_{34} \leq 20 \quad \text{Equation (7); or}$$

$$ALT/AGL_{34} \leq 12 \quad \text{Equation (7'); or}$$

ALT and $CT_2$ could be controlled to satisfy the equation as follows:

$$ALT/CT_2 \leq 6.5 \quad \text{Equation (8).}$$

Aforesaid exemplary embodiments are not limited and could be selectively incorporated in other embodiments described herein.

Reference is now made to equation (1). The value of $ALT/AGL_{12}$ is preferable to no greater than 36 to satisfy equation (1). This is because when equation (1) is not satisfied due to either a great value of ALT or a small value of $AGL_{12}$, the former would be unfavorable for reducing the length of the optical imaging lens and the later would be unfavorable for assembly. When equation (1) is satisfied, the sum of the thickness of all lens elements along the optical axis (ALT) is small enough to shorten the length of the optical imaging lens. $AGL_{12}$ is less likely to be shrinked since too small $AGL_{12}$ would cause the first and second lens elements contact with each other, which is unfavorable for assembly. Additionally, the value of $ALT/AGL_{12}$ is suggested to within 10~36.

Reference is now made to equation (2). The value of $AGL_{34} - AGL_{12}$ is preferable greater than or equal to 0 (mm), i.e. the air gap between the third and fourth lens elements is greater than that between the first and second lens elements. This is because a greater distance between the third and fourth lens elements could disperse light onto a proper level and adjust an angle of light emitting on an image plane approaching to perpendicular angle more, which will improve the image quality. With the help of the convex image-side surface of the first lens element, the shortened air gap between the first and second lens elements will assist in shortening the length of the optical imaging lens. However, it is suggested that the value of $AGL_{34} - AGL_{12}$ should not too large, preferably, between 0~0.3 (mm).

Reference is now made to equation (3). The value of $AGL_{23} - CT_3$ is preferable greater than or equal to 0. This is because shortening $AGL_{23}$ is not easy for the opposite concave surfaces of the image-side surface of the second lens element and the object-side surface of the third lens element, compared with shortening $CT_3$. However, it is suggested that the value of $AGL_{23}-CT_3$ should not too large, preferably, between 0~0.3 (mm).

Reference is now made to equation (4). As mentioned, the air gaps around the third lens element are not small, other air gaps should be shortened as much as possible to meet modern thinner-and-slimmer design. Since the first lens element provides the most converge ability, the ratio to shorten the thickness thereof is limited, compared with the third lens element. Therefore, the value of $CT_1-CT_3$ is preferable greater than or equal to 0 to satisfy equation (4), and preferably, it may be further restricted in 0~0.3 (mm).

Reference is now made to equation (5). The value of $CT_3/CT_2$ is preferable smaller than or equal to 1.7 to satisfy equation (5). This is because a proper ratio between the thicknesses of the second and third lens elements is favorable for sustaining the optical characters under the configuration of the refracting powers of the two lens elements.

Reference is now made to equation (6). The value of $CT_3/ALT$ is preferable smaller than or equal to 0.7 to satisfy equation (6). This is because shortening the thickness of the third lens element is seldom performed in prior arts, which usually shorten the thickness of the second and fourth lens elements. Therefore, the thickness of the third lens element should be shortened more than the sum of the thickness of all four lens elements (ALT). If not, the length of the optical imaging lens is not shortened properly. Preferably, the value of $CT_3/ALT$ may be further restricted in 0.1~0.7.

Reference is now made to equation (7). The value of $ALT/AGL_{34}$ is preferable smaller than or equal to 20 to satisfy equation (7). As mentioned, shortening ALT is benefit to shortening the length of the optical imaging lens, but $AGL_{34}$ is required to a certain distance for sustaining the image quality. When equation (7) is not satisfied due to either a great value of ALT or a small value of $AGL_{34}$, the both are unfavorable for shortening the optical imaging lens or sustaining the image quality. However, it is suggested that the value of $ALT/AGL_{34}$ should not too small, preferably, between 2~12 (mm).

Reference is now made to equation (8). The value of $ALT/CT_2$ is preferable smaller than or equal to 6.5 to satisfy equation (8). This is because the sum of the thickness of all lens elements should be shortened as possible since the thickness of the second lens element is less likely to be shortened. However, it is suggested that the value of $ALT/CT_2$ should not too small, preferably, between 3~6.5 (mm).

When implementing example embodiments, more details about the convex or concave surface structure and/or the refracting power may be incorporated for one specific lens element or broadly for plural lens elements to enhance the control for the system performance and/or resolution, as illustrated in the following embodiments. It is noted that the details listed here could be incorporated in example embodiments if no inconsistency occurs.

Several exemplary embodiments and associated optical data will now be provided for illustrating example embodiments of optical imaging lens with good optical characters and a shortened length. Reference is now made to FIGS. 1-5. FIG. 1 illustrates an example cross-sectional view of an optical imaging lens 1 having four lens elements of the optical imaging lens according to a first example embodiment. FIG. 2 shows example charts of longitudinal spherical aberration and other kinds of optical aberrations of the optical imaging lens 1 according to an example embodiment. FIG. 3 depicts another example cross-sectional view of a lens element of the optical imaging lens 1 according to an example embodiment. FIG. 4 illustrates an example table of optical data of each lens element of the optical imaging lens 1 according to an example embodiment. FIG. 5 depicts an example table of aspherical data of the optical imaging lens 1 according to an example embodiment.

As shown in FIG. 1, the optical imaging lens 1 of the present embodiment comprises, in order from an object side A1 to an image side A2, an aperture stop 100 positioned before a first lens element 110, the first lens element 110, a second lens element 120, a third lens element 130 and a fourth lens element 140. A filtering unit 150 and an image plane 160 of an image sensor are positioned at the image side A2 of the optical lens 1. Each of the first, second, third, and fourth lens elements 110, 120, 130, 140 and the filtering unit 150 has an object-side surface 111/121/131/141/151 facing toward the object side A1 and an image-side surface 112/122/132/142/152 facing toward the image side A2. The example embodiment of the filtering unit 150 illustrated is an IR cut filter (infrared cut filter) positioned between the fourth lens element 140 and an image plane 160. The filtering unit 150 is used for selectively absorbing infrared light to thereby reduce imperfection of images formed at the image plane 160.

Exemplary embodiments of each lens elements of the optical imaging lens 1 will now be described with reference to the drawings.

An example embodiment of the first lens element 110 may have positive refracting power, which may be constructed by plastic material. The object-side surface 111 is a convex surface and the image-side surface 112 is also a convex surface.

The second lens element 120 may have negative refracting power, which may be constructed by plastic material. The object-side surface 121 is a concave surface and the image-side surface 122 is also a concave surface.

The third lens element 130 may have positive refracting power, which may be constructed by plastic material. The object-side surface 131 is a concave surface, and the image-side surface 132 is a convex surface.

The fourth lens element 140 may have negative refracting power, which may be constructed by plastic material. The object-side surface 141 has a convex portion 1411 in a vicinity of the optical axis and a concave portion 1412 in a vicinity of a periphery of the fourth lens element 140. The image-side surface 142 has a concave portion 1421 in a vicinity of the optical axis and a convex portion 1422 in a vicinity of a periphery of the fourth lens element 140.

In example embodiments, air gaps exist between the lens elements 110, 120, 130, 140, the filtering unit 150, and the image plane 160 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the filtering unit 150, and the air gap d5 existing between the filtering unit 150 and the image plane 160 of the image sensor. However, in other embodiments, any of the aforesaid air gaps may or may not exist. For example, the profiles of opposite surfaces of any two adjacent lens elements may correspond to each other, and in such situation, the air gaps may not exist. The air gap d1 is denoted by $AGL_{12}$, the air gap d2 is denoted by $AGL_{23}$, the air gap d3 is denoted by $AGL_{34}$, and the sum of all air gaps d1, d2, d3 between the first and fourth lens elements 110, 140 is denoted by AAG.

FIG. 4 depicts the optical characters of each lens elements in the optical imaging lens 1 of the present embodiment, wherein the values of AAG, ALT, ALT/AGL$_{12}$, AGL$_{34}$−AGL$_{12}$, AGL$_{23}$−CT$_3$, CT$_1$−CT$_3$, CT$_3$/CT$_2$, CT$_3$/ALT, ALT/AGL$_{34}$ and ALT/CT$_2$ are:

$AAG=0.676$ (mm);

$ALT=1.408$ (mm);

$ALT/AGL_{12}=15.749$, satisfying equation (1);

$AGL_{34}-AGL_{12}=0.077$ (mm), satisfying equation (2);

$AGL_{23}-CT_3=0.023$ (mm), satisfying equation (3);

$CT_1-CT_3=0.113$ (mm), satisfying equation (4);

$CT_3/CT_2=2.157$;

$CT_3/ALT=0.282$, satisfying equation (6);

$ALT/AGL_{34}=8.471$, satisfying equation (7), (7');

$ALT/CT_2=7.636$;

wherein the distance from the object-side surface 111 of the first lens element 110 to the image plane 160 is 3.174 (mm), and the length of the optical imaging lens 1 is shortened.

Please note that, in example embodiments, to clearly illustrate the structure of each lens element, only the part where light passes, is shown. For example, taking the first lens element 110 as an example, FIG. 1 illustrates the object-side surface 111 and the image-side surface 112. However, when implementing each lens element of the present embodiment, a fixing part for positioning the lens elements inside the optical imaging lens 1 may be formed selectively. Based on the first lens element 110, please refer to FIG. 3, which illustrates the first lens element 110 further comprising a fixing part. Here the fixing part is not limited to a protruding part 113 extending from the object-side convex surface 111 and the image-side convex surface 112 for mounting the first lens element 110 in the optical imaging lens 1, and ideally, light will not pass through the protruding part 113.

The aspherical surfaces, including the object-side surface 111 and the image-side surface 112 of the first lens element 110, the object-side surface 121 and the image-side surface 122 of the second lens element 120, the object-side surface 131 and the image-side surface 132 of the third lens element 130, and the object-side surface 141 and the image-side surface 142 of the fourth lens element 140 are all defined by the following aspherical formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_i$ represents a aspherical coefficient of i$^{th}$ level.

The values of each aspherical parameter are shown in FIG. 5.

As illustrated in FIG. 2, longitudinal spherical aberration (a), the curves of different wavelengths are closed to each other. This represents off-axis light with respect to these wavelengths is focused around an image point. From the vertical deviation of each curve shown therein, the offset of the off-axis light relative to the image point is within ±0.02 (mm). Therefore, the present embodiment improves the longitudinal spherical aberration with respect to different wavelengths. Additionally, the closed curves represent the image positions with respect to different wavelengths are closed, and the chromatic aberration is also improved.

Please refer to FIG. 2, astigmatism aberration in the sagittal direction (b) and astigmatism aberration in the tangential direction (c). The focus with respect to the three wavelengths in the whole field falls within ±0.10 (mm), and the focus in the sagittal direction falls even within ±0.05 (mm). This reflects the optical imaging lens 1 of the present embodiment eliminates aberration effectively. Additionally, the closed curves represents dispersion is improved.

Please refer to FIG. 2, distortion aberration (d), which showing the variation of the distortion aberration is within ±6%. Such distortion aberration meets the requirement of acceptable image quality and shows the optical imaging lens 1 of the present embodiment could restrict the distortion aberration to raise the image quality even though the length of the optical imaging lens 1 is shortened to smaller than 3.5 mm.

Therefore, the optical imaging lens 1 of the present embodiment shows great characteristics in the longitudinal spherical aberration, astigmatism in the sagittal direction, astigmatism in the tangential direction, and distortion aberration. According to above illustration, the optical imaging lens 1 of the example embodiment indeed achieves great optical performance and the length of the optical imaging lens 1 is effectively shortened.

Figure 6:
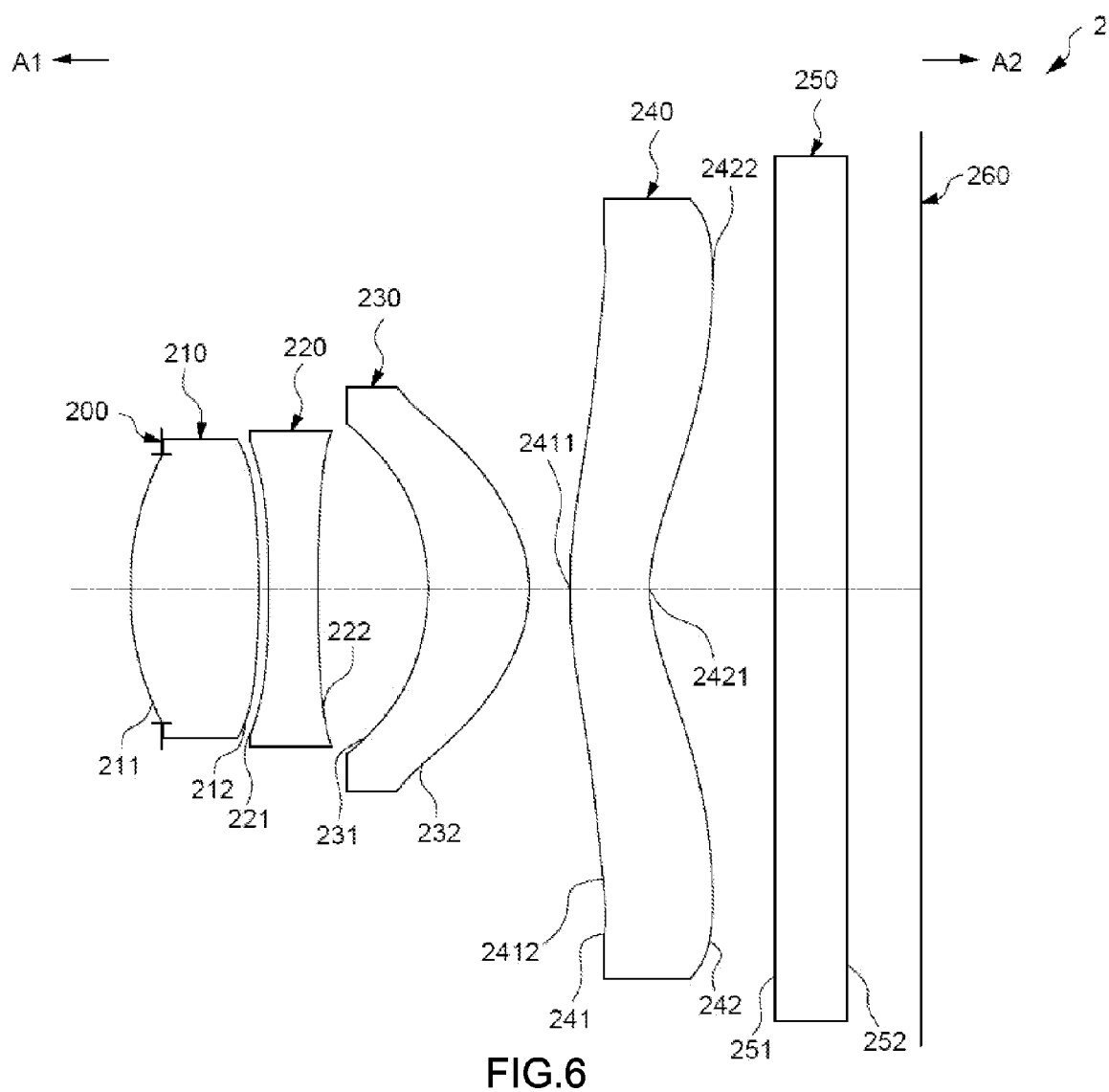
FIG. 6 is a cross-sectional view of a second embodiment of an optical imaging lens having four lens elements according to the present disclosures.
Figure 7:
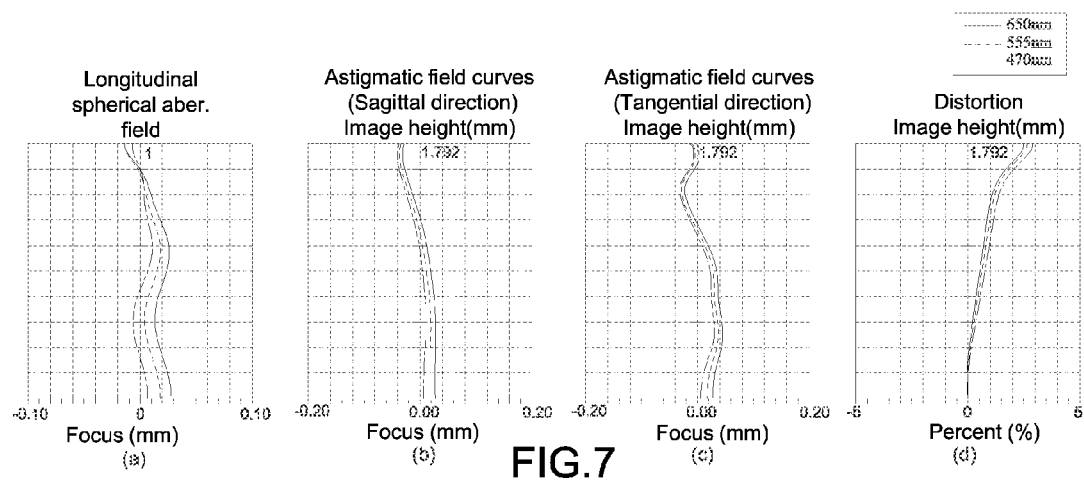
FIG. 7 is a chart of longitudinal spherical aberration and other kinds of optical aberrations of a second embodiment of the optical imaging lens according to the present disclosures.

Reference is now made to FIGS. 6-9. FIG. 6 illustrates an example cross-sectional view of an optical imaging lens 2 having four lens elements of the optical imaging lens according to a second example embodiment. FIG. 7 shows example charts of longitudinal spherical aberration and other kinds of optical aberrations of the optical imaging lens 2 according to the second example embodiment. FIG. 8 shows an example table of optical data of each lens element of the optical imaging lens 2 according to the second example embodiment. FIG. 9 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 211 for labeling the object-side surface of the first lens element 210, reference number 212 for labeling the image-side surface of the first lens element 210, etc.

As shown in FIG. 6, the optical imaging lens 2 of the present embodiment, in an order from an object side A1 to an image side A2, comprises an aperture stop 200 positioned in front of a first lens element 210, the first lens element 210, a second lens element 220, a third lens element 230, and a fourth lens element 240.

The differences between the second embodiment and the first embodiment are the radius, thickness of each lens element and the distance of each air gap, but the refracting power and configuration of the concave/convex shape of the lens elements are similar to those in the first embodiment. Please refer to FIG. 8 for the optical characteristics of each lens elements in the optical imaging lens 2 of the present embodiment, wherein the values of AAG, ALT, ALT/AGL$_{12}$, AGL$_{34}$-AGL$_{12}$, AGL$_{23}$-CT$_3$, CT$_1$-CT$_3$, CT$_3$/CT$_2$, CT$_3$/ALT, ALT/AGL$_{34}$ and ALT/CT$_2$ are:

$AAG=0.648$ (mm);

$ALT=1.438$ (mm);

$ALT/AGL_{12}=33.416$, satisfying equation (1);

$AGL_{34}-AGL_{12}=0.121$ (mm), satisfying equation (2);

$AGL_{23}-CT_3=0.036$ (mm), satisfying equation (3);

$CT_1-CT_3=0.110$ (mm), satisfying equation (4);

$CT_3/CT_2=2.024$;

$CT_3/ALT=0.281$, satisfying equation (6);

$ALT/AGL_{34}=8.751$, satisfying equation (7), (7');

$ALT/CT_2=7.203$;

wherein the distance from the object side surface 211 of the first lens element 210 to the image plane 260 is 3.176 (mm) and the length of the optical imaging lens 2 is shortened.

As shown in FIG. 7, the optical imaging lens 2 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 2 is effectively shortened.

Figure 10:
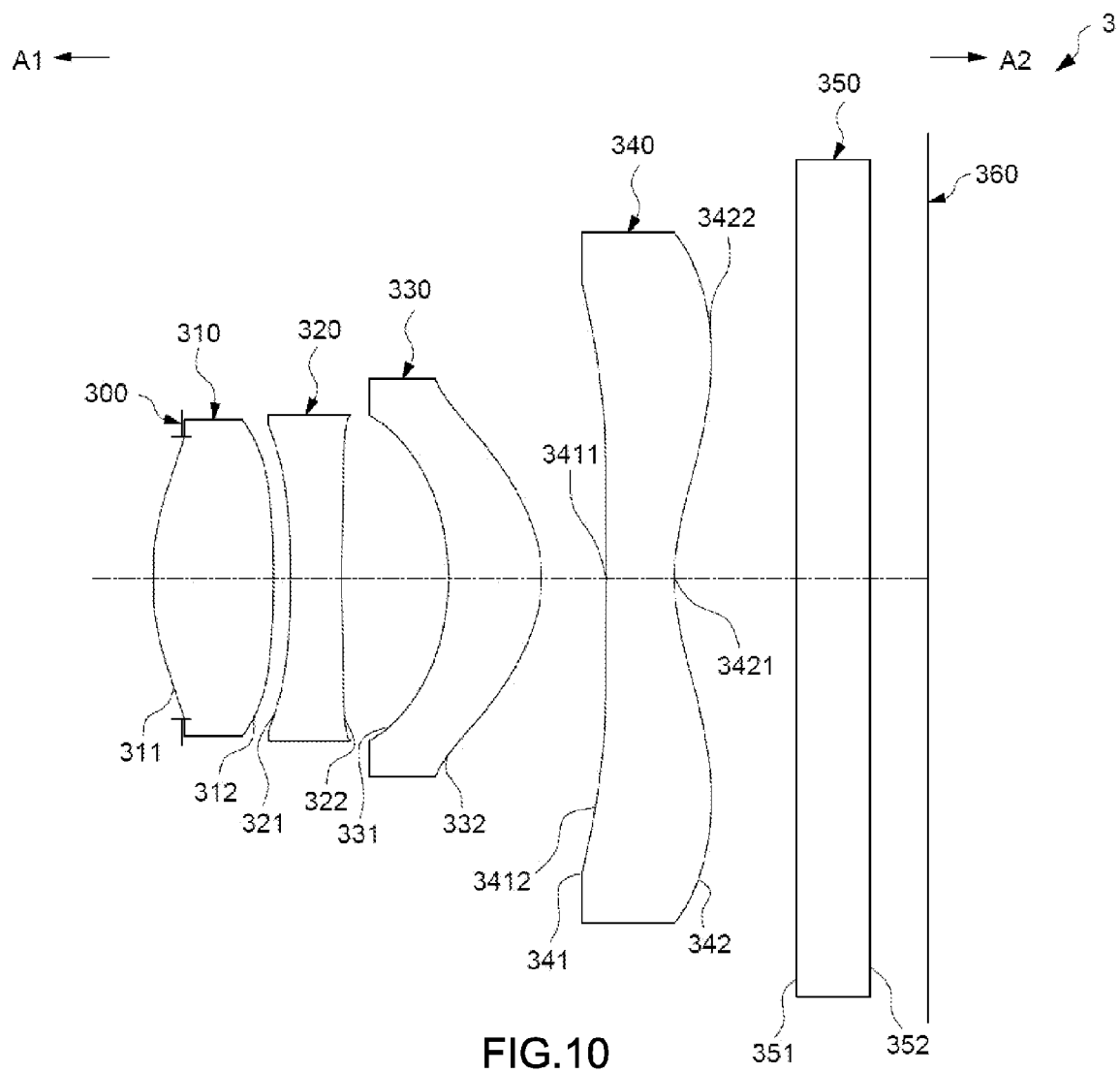
FIG. 10 is a cross-sectional view of a third embodiment of an optical imaging lens having four lens elements according to the present disclosures.
Figure 11:
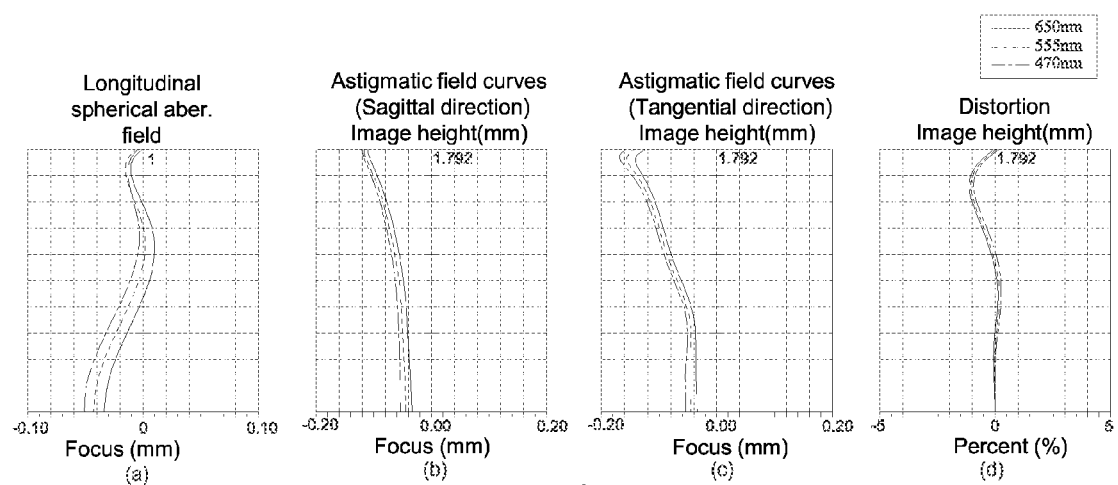
FIG. 11 is a chart of longitudinal spherical aberration and other kinds of optical aberrations of a third embodiment of the optical imaging lens according the present disclosures.

Reference is now made to FIGS. 10-13. FIG. 10 illustrates an example cross-sectional view of an optical imaging lens 3 having four lens elements of the optical imaging lens according to a third example embodiment. FIG. 11 shows example charts of longitudinal spherical aberration and other kinds of optical aberrations of the optical imaging lens 3 according to the third example embodiment. FIG. 12 shows an example table of optical data of each lens element of the optical imaging lens 3 according to the third example embodiment. FIG. 13 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 311 for labeling the object-side surface of the first lens element 310, reference number 312 for labeling the image-side surface of the first lens element 310, etc.

As shown in FIG. 10, the optical imaging lens 3 of the present embodiment, in an order from an object side Al to an image side A2, comprises an aperture stop 300 positioned in front of a first lens element 310, the first lens element 310, a second lens element 320, a third lens element 330, and a fourth lens element 340.

The differences between the third embodiment and the first embodiment are the radius, thickness of each lens element and the distance of each air gap, but the refracting power and configuration of the concave/convex shape of the lens elements are similar to those in the first embodiment. Please refer to FIG. 12 for the optical characteristics of each lens elements in the optical imaging lens 3 of the present embodiment, wherein the values of AAG, ALT, ALT/AGL$_{12}$, AGL$_{34}$-AGL$_{12}$, AGL$_{23}$-CT$_3$, CT$_1$-CT$_3$, CT$_3$/CT$_2$, CT$_3$/ALT, ALT/AGL$_{34}$ and ALT/CT$_2$ are:

$AAG=0.768$ (mm);

$ALT=1.360$ (mm);

$ALT/AGL_{12}=18.791$, satisfying equation (1);

$AGL_{34}-AGL_{12}=0.187$ (mm), satisfying equation (2);

$AGL_{23}-CT_3=0.054$ (mm), satisfying equation (3);

$CT_1-CT_3=0.104$ (mm), satisfying equation (4);

$CT_3/CT_2=1.818$;

$CT_3/ALT=0.281$, satisfying equation (6);

$ALT/AGL_{34}=5.236$, satisfying equation (7), (7');

$ALT/CT_2=6.478$, satisfying equation (8);

wherein the distance from the object side surface 311 of the first lens element 310 to the image plane 360 is 3.172 (mm) and the length of the optical imaging lens 3 is shortened.

As shown in FIG. 11, the optical imaging lens 3 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 3 is effectively shortened.

Figure 14:
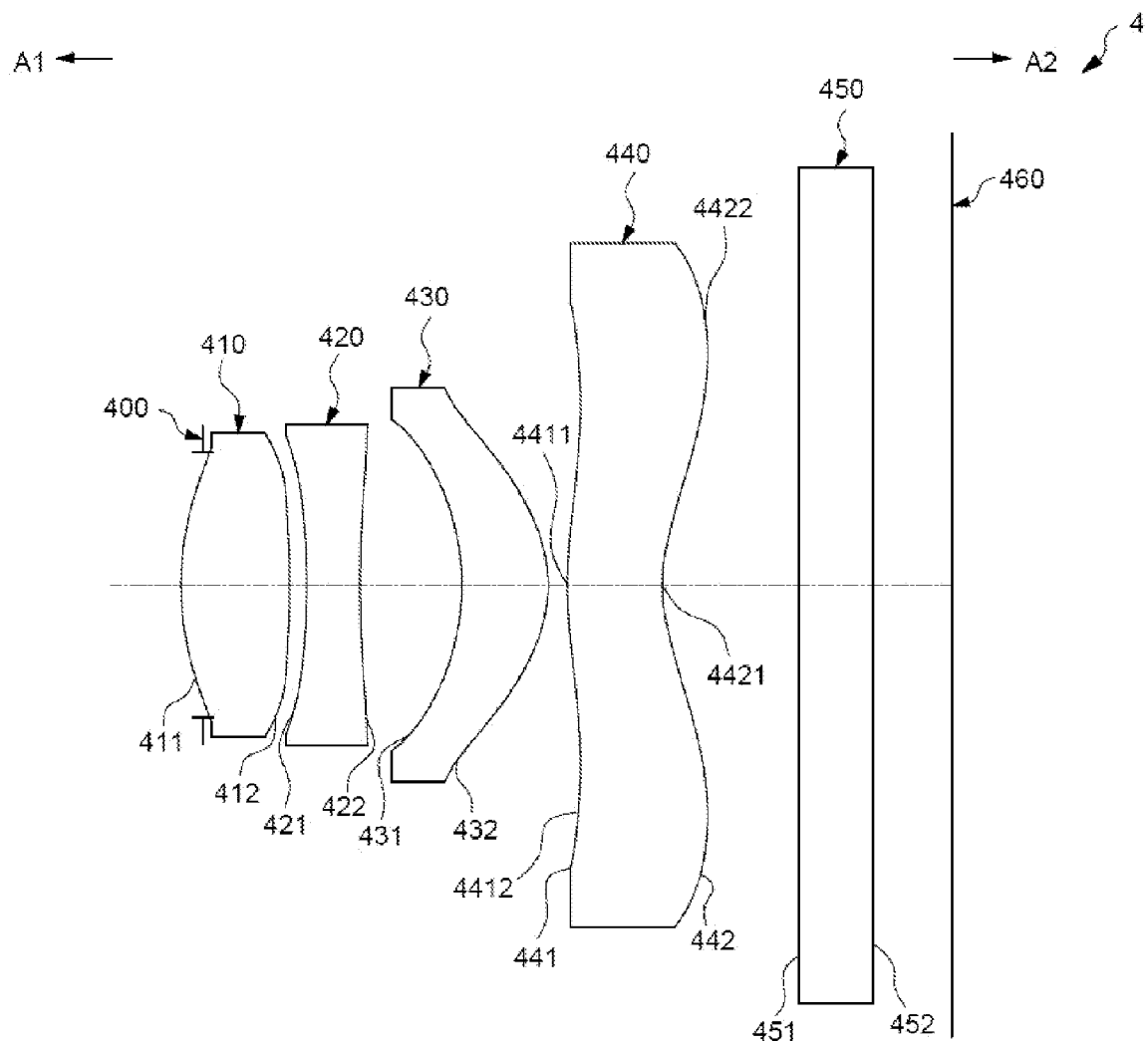
FIG. 14 is a cross-sectional view of a fourth embodiment of an optical imaging lens having four lens elements according to the present disclosures.
Figure 15:
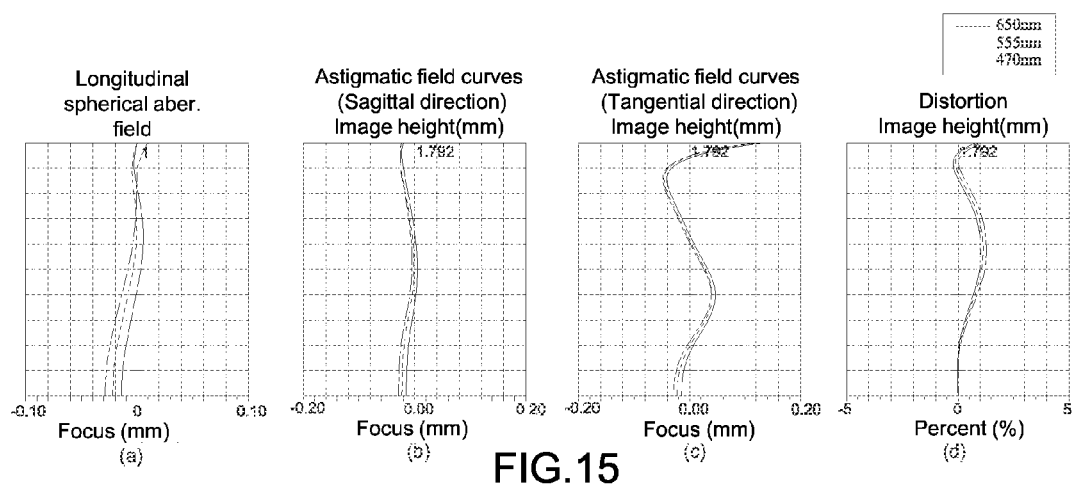
FIG. 15 is a chart of longitudinal spherical aberration and other kinds of optical aberrations of a fourth embodiment of the optical imaging lens according the present disclosures.

Reference is now made to FIGS. 14-17. FIG. 14 illustrates an example cross-sectional view of an optical imaging lens 4 having four lens elements of the optical imaging lens according to a fourth example embodiment. FIG. 15 shows example charts of longitudinal spherical aberration and other kinds of optical aberrations of the optical imaging lens 4 according to the fourth example embodiment. FIG. 16 shows an example table of optical data of each lens element of the optical imaging lens 4 according to the fourth example embodiment. FIG. 17 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 411 for labeling the object-side surface of the first lens element 410, reference number 412 for labeling the image-side surface of the first lens element 410, etc.

As shown in FIG. 14, the optical imaging lens 4 of the present embodiment, in an order from an object side Al to an image side A2, comprises an aperture stop 400 positioned in front of a first lens element 410, the first lens element 410, a second lens element 420, a third lens element 430, and a fourth lens element 440.

The differences between the fourth embodiment and the first embodiment are the radius, thickness of each lens element and the distance of each air gap, but the refracting power and configuration of the concave/convex shape of the lens elements are similar to those in the first embodiment. Please refer to FIG. 16 for the optical characteristics of each lens elements in the optical imaging lens 4 of the present embodiment, wherein the values of AAG, ALT, ALT/AGL$_{12}$, AGL$_{34}$-AGL$_{12}$, AGL$_{23}$-CT$_3$, CT$_1$-CT$_3$, CT$_3$/CT$_2$, CT$_3$/ALT, ALT/AGL$_{34}$ and ALT/CT$_2$ are:

$AAG=0.547$ (mm);

$ALT=1.373$ (mm);

$ALT/AGL_{12}=21.113$, satisfying equation (1);

$AGL_{34}-AGL_{12}=0.011$ (mm), satisfying equation (2);

$AGL_{23}-CT_3=0.063$ (mm), satisfying equation (3);

$CT_1-CT_3=0.092$ (mm), satisfying equation (4);

$CT_3/CT_2=1.589$, satisfying equation (5);

$CT_3/ALT=0.250$, satisfying equation (6);

$ALT/AGL_{34}=18.064$, satisfying equation (7);

$ALT/CT_2=6.358$, satisfying equation (8);

wherein the distance from the object side surface 411 of the first lens element 410 to the image plane 460 is 3.078 (mm) and the length of the optical imaging lens 4 is shortened.

As shown in FIG. 15, the optical imaging lens 4 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 4 is effectively shortened.

Figure 18:
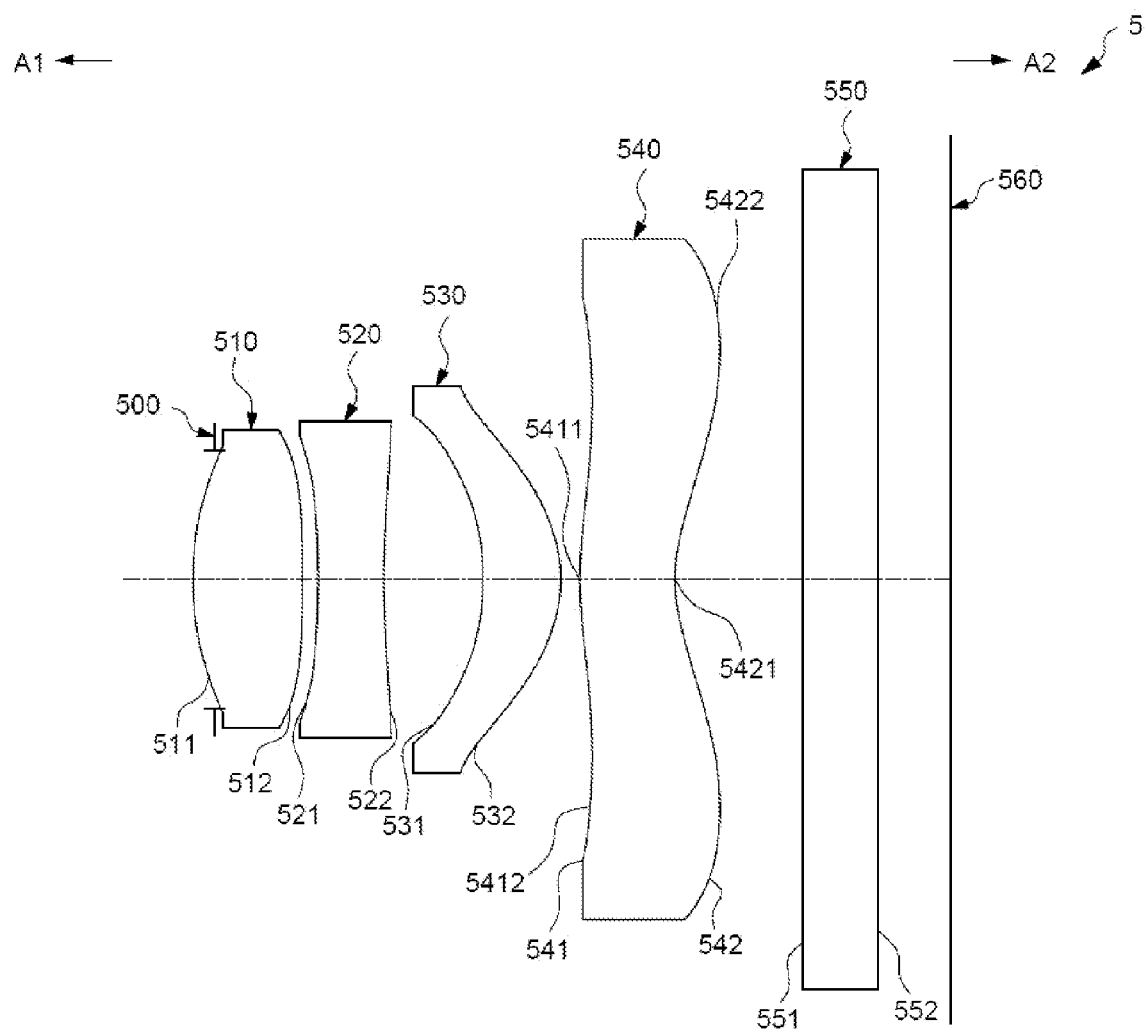
FIG. 18 is a cross-sectional view of a fifth embodiment of an optical imaging lens having four lens elements according to the present disclosures.
Figure 19:
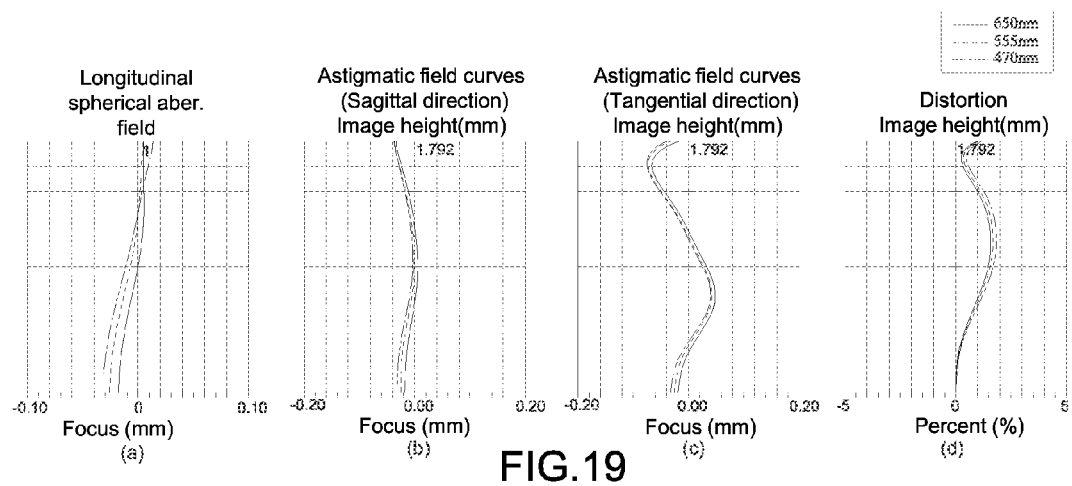
FIG. 19 is a chart of longitudinal spherical aberration and other kinds of optical aberrations of a fifth embodiment of the optical imaging lens according the present disclosures.

Reference is now made to FIGS. 18-21. FIG. 18 illustrates an example cross-sectional view of an optical imaging lens 5 having four lens elements of the optical imaging lens according to a fifth example embodiment. FIG. 19 shows example charts of longitudinal spherical aberration and other kinds of optical aberrations of the optical imaging lens 5 according to the fifth example embodiment. FIG. 20 shows an example table of optical data of each lens element of the optical imaging lens 5 according to the fifth example embodiment. FIG. 21 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 511 for labeling the object-side surface of the first lens element 510, reference number 512 for labeling the image-side surface of the first lens element 510, etc.

As shown in FIG. 18, the optical imaging lens 5 of the present embodiment, in an order from an object side Al to an image side A2, comprises an aperture stop 500 positioned in front of a first lens element 510, the first lens element 510, a second lens element 520, a third lens element 530, and a fourth lens element 540.

The differences between the fifth embodiment and the first embodiment are the radius, thickness of each lens element and the distance of each air gap, but the refracting power and configuration of the concave/convex shape of the lens elements are similar to those in the first embodiment. Please refer to FIG. 20 for the optical characteristics of each lens elements in the optical imaging lens 5 of the present embodiment, wherein the values of AAG, ALT, $ALT/AGL_{12}$, $AGL_{34}-AGL_{12}$, $AGL_{23}-CT_3$, $CT_1-CT_3$, $CT_3/CT_2$, $CT_3/ALT$, $ALT/AGL_{34}$ and $ALT/CT_2$ are:

$AAG=0.545$ (mm);

$ALT=1.407$ (mm);

$ALT/AGL_{12}=21.627$, satisfying equation (1);

$AGL_{34}-AGL_{12}=0.010$ (mm), satisfying equation (2);

$AGL_{23}-CT_3=0.092$ (mm), satisfying equation (3);

$CT_1-CT_3=0.134$ (mm), satisfying equation (4);

$CT_3/CT_2=1.179$, satisfying equation (5);

$CT_3/ALT=0.222$, satisfying equation (6);

$ALT/AGL_{34}=18.723$, satisfying equation (7);

$ALT/CT_2=5.317$, satisfying equation (8);

wherein the distance from the object side surface 511 of the first lens element 510 to the image plane 560 is 3.067 (mm) and the length of the optical imaging lens 5 is shortened.

As shown in FIG. 19, the optical imaging lens 5 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 5 is effectively shortened.

Figure 22:
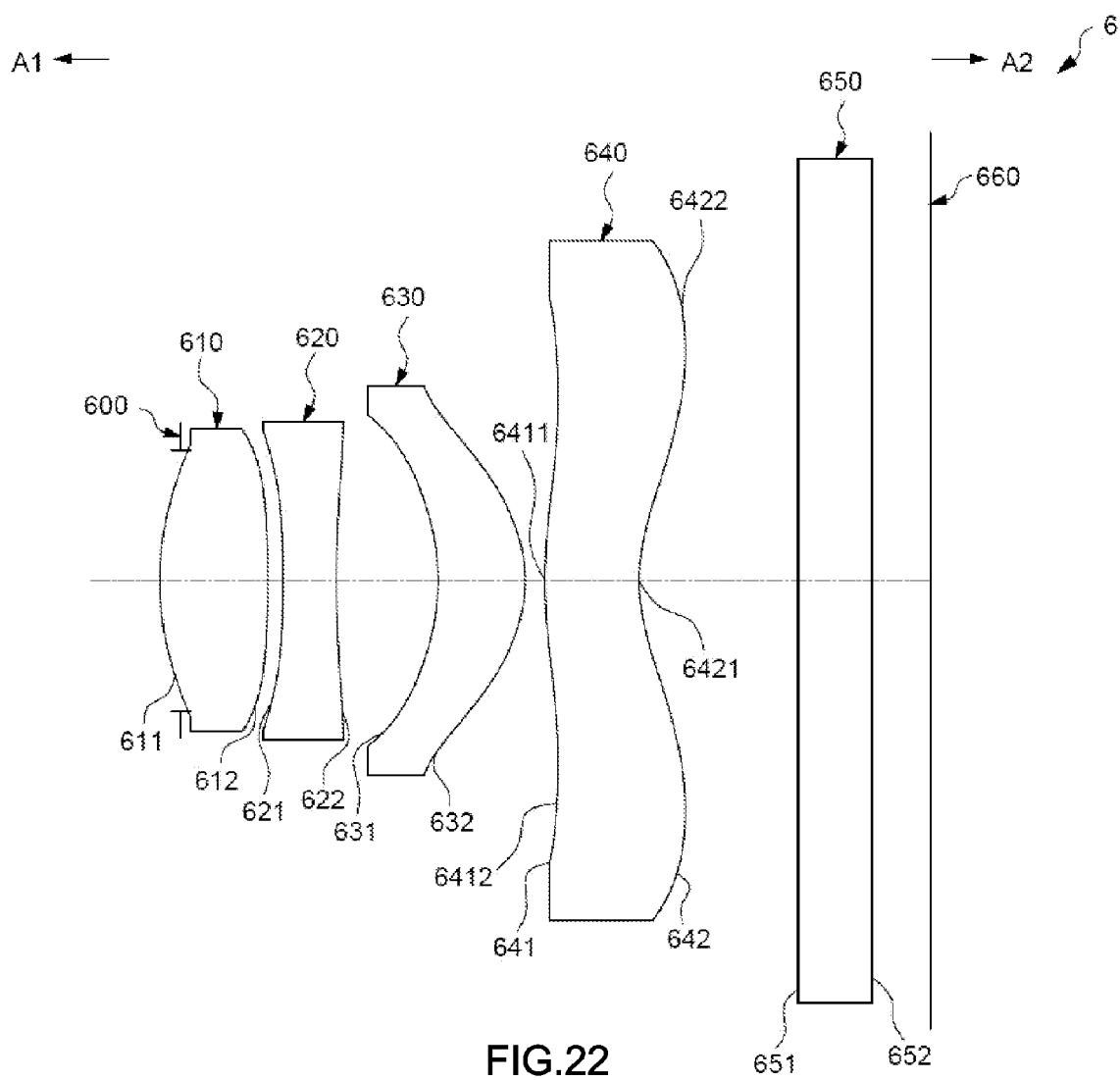
FIG. 22 is a cross-sectional view of a sixth embodiment of an optical imaging lens having four lens elements according to the present disclosures.
Figure 23:
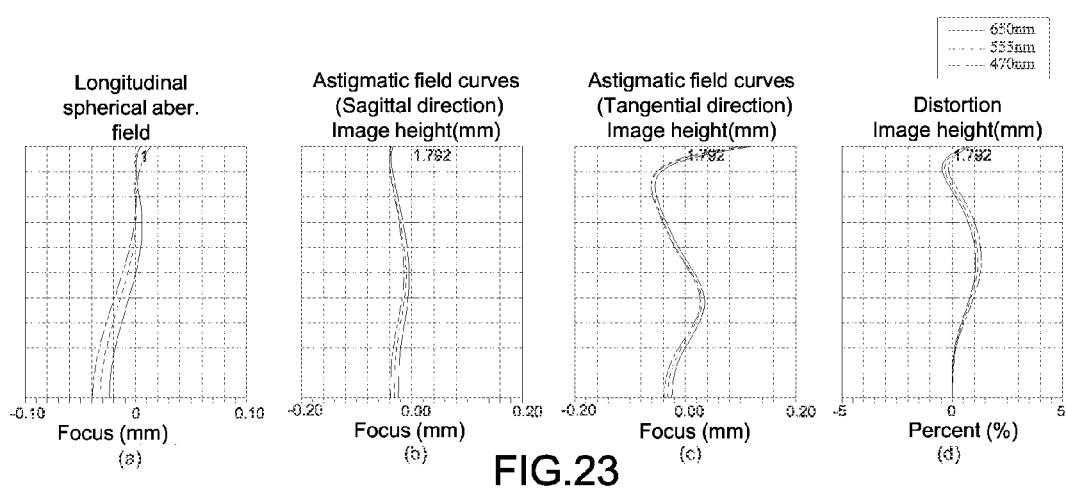
FIG. 23 is a chart of longitudinal spherical aberration and other kinds of optical aberrations of a sixth embodiment of the optical imaging lens according the present disclosures.

Reference is now made to FIGS. 22-25. FIG. 22 illustrates an example cross-sectional view of an optical imaging lens 6 having four lens elements of the optical imaging lens according to a sixth example embodiment. FIG. 23 shows example charts of longitudinal spherical aberration and other kinds of optical aberrations of the optical imaging lens 6 according to the sixth example embodiment. FIG. 24 shows an example table of optical data of each lens element of the optical imaging lens 6 according to the sixth example embodiment. FIG. 25 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 611 for labeling the object-side surface of the first lens element 610, reference number 612 for labeling the image-side surface of the first lens element 610, etc.

As shown in FIG. 22, the optical imaging lens 6 of the present embodiment, in an order from an object side Al to an image side A2, comprises an aperture stop 600 positioned in front of a first lens element 610, the first lens element 610, a second lens element 620, a third lens element 630, and a fourth lens element 640.

The differences between the sixth embodiment and the first embodiment are the radius, thickness of each lens element and the distance of each air gap, but the refracting power and configuration of the concave/convex shape of the lens elements are similar to those in the first embodiment. Please refer to FIG. 24 for the optical characteristics of each lens elements in the optical imaging lens 6 of the present embodiment, wherein the values of AAG, ALT, $ALT/AGL_{12}$, $AGL_{34}-AGL_{12}$, $AGL_{23}-CT_3$, $CT_1-CT_3$, $CT_3/CT_2$, $CT_3/ALT$, $ALT/AGL_{34}$ and $ALT/CT_2$ are:

$AAG=0.546$ (mm);

$ALT=1.371$ (mm);

$ALT/AGL_{12}=21.068$, satisfying equation (1);

$AGL_{34}-AGL_{12}=0.010$ (mm), satisfying equation (2);

$AGL_{23}-CT_3=0.056$ (mm), satisfying equation (3);

$CT_1-CT_3=0.081$ (mm), satisfying equation (4);

| | |
|---|---|
| $CT_3/CT_2=1.643$, | satisfying equation (5); |
| $CT_3/ALT=0.255$, | satisfying equation (6); |
| $ALT/AGL_{34}=18.251$, | satisfying equation (7); |
| $ALT/CT_2=6.438$, | satisfying equation (8); | wherein the distance from the object side surface 611 of the first lens element 610 to the image plane 660 is 3.084 (mm) and the length of the optical imaging lens 6 is shortened.

As shown in FIG. 23, the optical imaging lens 6 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 6 is effectively shortened.

Figure 26:
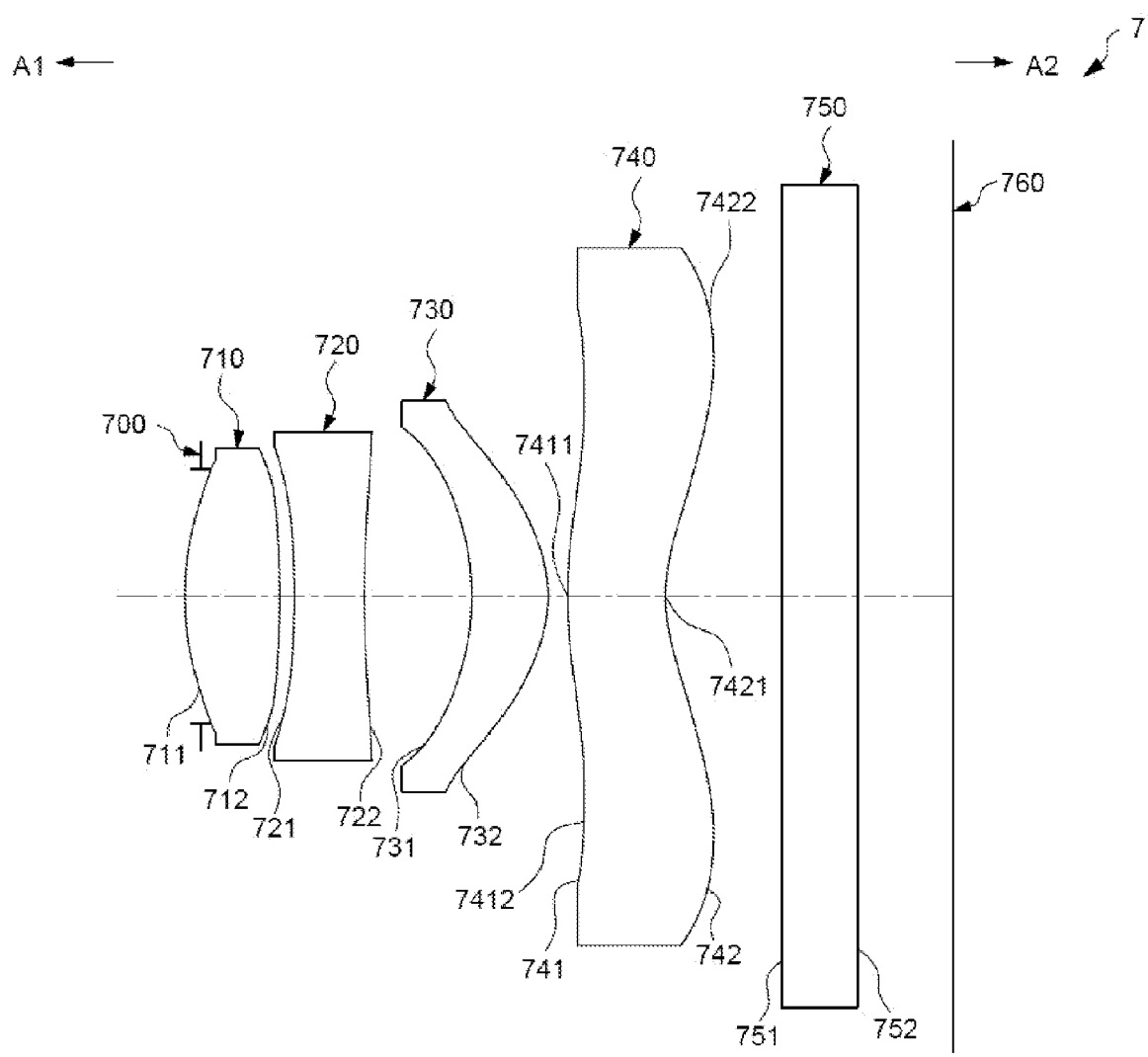
FIG. 26 is a cross-sectional view of a seventh embodiment of an optical imaging lens having four lens elements according to the present disclosures.
Figure 27:
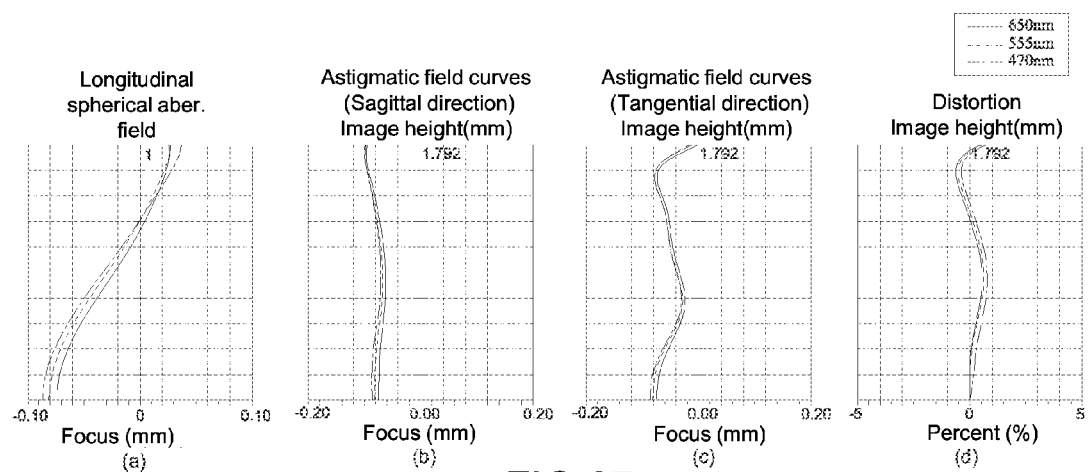
FIG. 27 is a chart of longitudinal spherical aberration and other kinds of optical aberrations of a seventh embodiment of the optical imaging lens according the present disclosures.

Reference is now made to FIGS. 26-29. FIG. 26 illustrates an example cross-sectional view of an optical imaging lens 7 having four lens elements of the optical imaging lens according to a seventh example embodiment. FIG. 27 shows example charts of longitudinal spherical aberration and other kinds of optical aberrations of the optical imaging lens 7 according to the seventh example embodiment. FIG. 28 shows an example table of optical data of each lens element of the optical imaging lens 7 according to the seventh example embodiment. FIG. 29 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 711 for labeling the object-side surface of the first lens element 710, reference number 712 for labeling the image-side surface of the first lens element 710, etc.

As shown in FIG. 26, the optical imaging lens 7 of the present embodiment, in an order from an object side A1 to an image side A2, comprises an aperture stop 700 positioned in front of a first lens element 710, the first lens element 710, a second lens element 720, a third lens element 730, and a fourth lens element 740.

The differences between the seventh embodiment and the first embodiment are the radius, thickness of each lens element and the distance of each air gap, but the refracting power and configuration of the concave/convex shape of the lens elements are similar to those in the first embodiment. Please refer to FIG. 28 for the optical characteristics of each lens elements in the optical imaging lens 7 of the present embodiment, wherein the values of AAG, ALT, ALT/AGL$_{12}$, AGL$_{34}$−AGL$_{12}$, AGL$_{23}$−CT$_3$, CT$_1$−CT$_3$, CT$_3$/CT$_2$, CT$_3$/ALT, ALT/AGL$_{34}$ and ALT/CT$_2$ are:

$AAG=0.558$ (mm);

$ALT=1.338$ (mm);

| | |
|---|---|
| $ALT/AGL_{12}=23.064$, | satisfying equation (1); |
| $AGL_{34}-AGL_{12}=0.017$ (mm), | satisfying equation (2); |
| $AGL_{23}-CT_3=0.125$ (mm), | satisfying equation (3); |
| $CT_1-CT_3=0.071$ (mm), | satisfying equation (4); |
| $CT_3/CT_2=1.072$, | satisfying equation (5); |
| $CT_3/ALT=0.224$, | satisfying equation (6); |
| $ALT/AGL_{34}=17.866$, | satisfying equation (7); |
| $ALT/CT_2=4.778$, | satisfying equation (8); | wherein the distance from the object side surface 711 of the first lens element 710 to the image plane 760 is 3.033 (mm) and the length of the optical imaging lens 7 is shortened.

As shown in FIG. 27, the optical imaging lens 7 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 7 is effectively shortened.

Please refer to FIG. 30, which shows the values of AAG, ALT, ALT/AGL$_{12}$, AGL$_{34}$−AGL$_{12}$, AGL$_{23}$−CT$_3$, CT$_1$−CT$_3$, CT$_3$/CT$_2$, CT$_3$/ALT, ALT/AGL$_{34}$ and ALT/CT$_2$ of all seven embodiments, and it is clear that the optical imaging lens of the present invention satisfy the Equations (1), (2), (3), (4), (5), (6), (7)/(7'), and/or (8).

Figure 31:
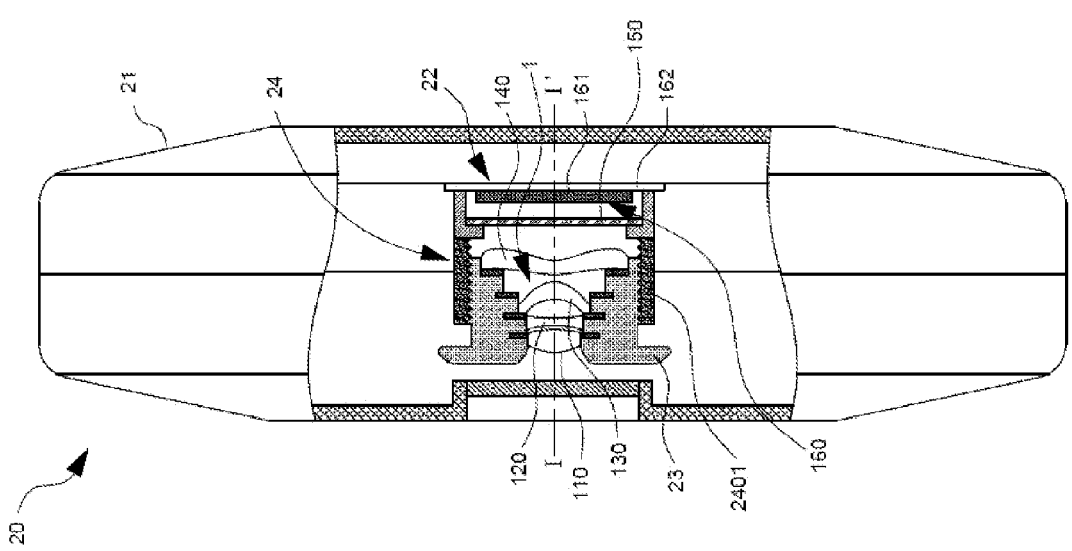
FIG. 31 is a structure of an example embodiment of a mobile device.

Reference is now made to FIG. 31, which illustrates an example structural view of a first embodiment of mobile device 20 applying an aforesaid optical imaging lens. The mobile device 20 comprises a housing 21 and a photography module 22 positioned in the housing 21. An example of the mobile device 20 may be, but is not limited to, a mobile phone.

As shown in FIG. 31, the photography module 22 may comprise an aforesaid optical imaging lens with four lens elements, for example the optical imaging lens 1 of the first embodiment, a lens barrel 23 for positioning the optical imaging lens 1, a module housing unit 24 for positioning the lens barrel 23, a substrate 162 for positioning the module housing unit 24, and an image sensor 161 which is positioned at an image side of the optical imaging lens 1. The image plane 160 is formed on the image sensor 161.

In some other example embodiments, the structure of the filtering unit 150 may be omitted. In some example embodiments, the housing 21, the lens barrel 23, and/or the module housing unit 24 may be integrated into a single component or assembled by multiple components. In some example embodiments, the image sensor 161 used in the present embodiment is directly attached to a substrate 162 in the form of a chip on board (COB) package, and such package is different from traditional chip scale packages (CSP) since COB package does not require a cover glass before the image sensor 161 in the optical imaging lens 1. Aforesaid exemplary embodiments are not limited to this package type and could be selectively incorporated in other described embodiments.

The four lens elements 110, 120, 130, 140 are positioned in the lens barrel 23 in the way of separated by an air gap between any two adjacent lens elements.

The module housing unit 24 comprises a seat element 2401 for positioning the lens barrel 23. The lens barrel 23 and the seat element 2401 are positioned along a same axis I-I', and the lens barrel 23 is positioned inside the seat element 2401.

Because the length of the optical imaging lens 1 is merely 3.174 (mm), the size of the mobile device 20 may be quite small. Therefore, the embodiments described herein meet the market demand for smaller sized product designs.

Figure 32:
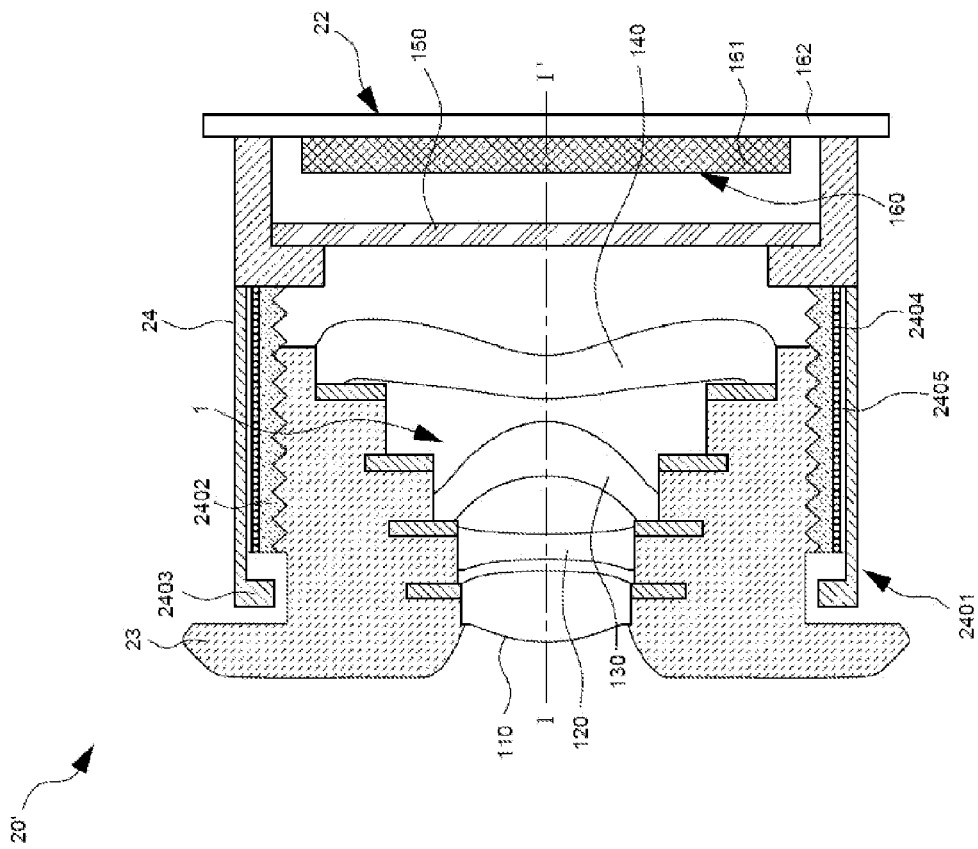
FIG. 32 is a partially enlarged view of the structure of another example embodiment of a mobile device.

Reference is now made to FIG. 32, which shows another structural view of a second embodiment of mobile device 20' applying the aforesaid optical imaging lens 1. One difference between the mobile device 20' and the mobile device 20 may be the seat element 2401 comprises a first seat unit 2402, a second seat unit 2403, a coil 2404, and a magnetic unit 2405. Here, the seat element 2401 could move along the optical axis of the optical imaging lens 1. The first seat unit 2402 is close to the outside of the lens barrel 23, and positioned along an axis I-I', and the second seat unit 2403 is around the outside of the first seat unit 2402 and positioned along with the axis I-I'. The coil 2404 is positioned between the first seat unit 2402 and the inside of the second seat unit 2403. The magnetic unit 2405 is positioned between the outside of the coil 2404 and the inside of the second seat unit 2403.

The lens barrel 23 and the optical imaging lens 1 positioned therein are driven by the first seat unit 2402 for moving along the axis I-I'. The rest structure of the mobile device 20' is similar to the mobile device 20.

Similarly, because the length of the optical imaging lens 1, 3.174 (mm), is shortened, the mobile device 20' may be designed with a smaller size and meanwhile good optical performance is still provided. Therefore, the present embodiment meets the demand of small sized product design and the request of the market.

According to above illustration, it is clear that the mobile device and the optical imaging lens thereof in example embodiments, through controlling ratio of a sum of central thickness of all four lens elements to air gaps between the first and second lens elements along the optical axis to in a pre-determined range, and incorporated with detail structure and/or reflection power of the lens elements, the length of the optical imaging lens is effectively shortened and meanwhile good optical characters are still provided.

While various embodiments in accordance with the disclosed principles have been described above, it should be understood that they have been presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side, comprising an aperture stop, first, second, third and fourth lens elements, each of said first, second, third and fourth lens elements having an object-side surface facing toward the object side and an image-side surface facing toward the image side, wherein:
   said first lens element has positive refracting power, and said image-side surface thereof is a convex surface;
   said second lens element has negative refracting power, and said image-side surface thereof is a concave surface;
   said third lens element has positive refracting power, said object-side surface thereof is a concave surface, and said image-side surface thereof is a convex surface;
   said object-side surface of said fourth lens element comprises a convex portion in a vicinity of the optical axis and a concave portion in a vicinity of a periphery of the fourth lens element;
   said optical imaging lens as a whole has only the four lens elements having refracting power; and
   the sum of the thickness of all four lens elements along the optical axis is ALT, an air gap between the first lens element and the second lens element along the optical axis is $AGL_{12}$, and ALT and $AGL_{12}$ satisfy the equation:

$$ALT/AGL_{12} \leq 36.$$

2. The optical imaging lens according to claim 1, wherein an air gap between the third lens element and the fourth lens element along the optical axis is $AGL_{34}$, and $AGL_{34}$ and $AGL_{12}$ satisfy the equation:

$$AGL_{34} - AGL_{12} \geq 0 \text{ (mm)}.$$

3. The optical imaging lens according to claim 2, wherein an air gap between the second lens element and the third lens element along the optical axis is $AGL_{23}$, a central thickness of the third lens element along the optical axis is $CT_3$, and $AGL_{23}$ and $CT_3$ satisfy the equation:

$$AGL_{23} - CT_3 \geq 0 \text{ (mm)}.$$

4. The optical imaging lens according to claim 3, wherein a central thickness of the first lens element along the optical axis is $CT_1$, and $CT_1$ and $CT_3$ satisfy the equation:

$$CT_1 - CT_3 \geq 0 \text{ (mm)}.$$

5. The optical imaging lens according to claim 4, wherein ALT and $AGL_{34}$ satisfy the equation:

$$ALT/AGL_{34} \leq 20.$$

6. The optical imaging lens according to claim 2, wherein a central thickness of the first lens element along the optical axis is $CT_1$, a central thickness of the third lens element along the optical axis is $CT_3$, and $CT_1$ and $CT_3$ satisfy the equation:

$$CT_1 - CT_3 \geq 0 \text{ (mm)}.$$

7. The optical imaging lens according to claim 6, wherein an air gap between the third lens element and the fourth lens element along the optical axis is $AGL_{34}$, and ALT and $AGL_{34}$ satisfy the equation:

$$ALT/AGL_{34} \leq 20.$$

8. The optical imaging lens according to claim 7, wherein a central thickness of the second lens element along the optical axis is $CT_2$, and ALT and $CT_2$ satisfy the equation:

$$ALT/CT_2 \leq 6.5.$$

9. The optical imaging lens according to claim 2, wherein a central thickness of the second lens element along the optical axis is $CT_2$, a central thickness of the third lens element along the optical axis is $CT_3$, and $CT_2$ and $CT_3$ satisfy the equation:

$$CT_3/CT_2 \leq 1.7.$$

10. The optical imaging lens according to claim 9, wherein ALT and $AGL_{34}$ satisfy the equation:

$$ALT/AGL_{34} \leq 20.$$

11. The optical imaging lens according to claim 2, wherein a central thickness of the third lens element along the optical axis is $CT_3$, and ALT and $CT_3$ satisfy the equation:

$$CT_3/ALT \leq 0.7.$$

12. The optical imaging lens according to claim 11, wherein ALT and $AGL_{34}$ satisfy the equation:

$ALT/AGL_{34} \leq 20$.

13. The optical imaging lens according to claim 1, wherein an air gap between the second lens element and the third lens element along the optical axis is $AGL_{23}$, a central thickness of the third lens element along the optical axis is $CT_3$, and $AGL_{23}$ and $CT_3$ satisfy the equation:

$AGL_{23} - CT_3 \geq 0$ (mm).

14. The optical imaging lens according to claim 13, wherein a central thickness of the first lens element along the optical axis is $CT_1$, and $CT_1$ and $CT_3$ satisfy the equation:

$CT_1 - CT_3 \geq 0$ (mm).

15. The optical imaging lens according to claim 14, wherein a an air gap between the third lens element and the fourth lens element along the optical axis is $AGL_{34}$, and ALT and $AGL_{34}$ satisfy the equation:

$ALT/AGL_{34} \leq 20$.

16. The optical imaging lens according to claim 1, wherein a central thickness of the first lens element along the optical axis is $CT_1$, a central thickness of the third lens element along the optical axis is $CT_3$, and $CT_1$ and $CT_3$ satisfy the equation:

$CT_1 - CT_3 \geq 0$ (mm).

17. The optical imaging lens according to claim 16, wherein a central thickness of the second lens element along the optical axis is $CT_2$, and ALT and $CT_2$ satisfy the equation:

$ALT/CT_2 \leq 6.5$.

18. The optical imaging lens according to claim 17, wherein ALT and $AGL_{34}$ satisfy the equation:

$ALT/AGL_{34} \leq 12$.

19. A mobile device, comprising:
a housing; and
a photography module positioned in the housing and comprising:
 the optical imaging lens as claimed in claim 1;
 a lens barrel for positioning the optical imaging lens;
 a module housing unit for positioning the lens barrel;
 a substrate for positioning the module housing unit; and
 an image sensor positioned on the substrate and at the image side of the optical imaging lens.

20. The mobile device according to claim 19, wherein the module housing unit comprises a seat element for positioning the lens barrel and moving along with the optical axis of the optical imaging lens.

* * * * *